US011238414B2

(12) United States Patent
Radhakrishnan et al.

(10) Patent No.: US 11,238,414 B2
(45) Date of Patent: Feb. 1, 2022

(54) GENERATING DIGITAL ASSOCIATIONS BETWEEN DOCUMENTS AND DIGITAL CALENDAR EVENTS BASED ON CONTENT CONNECTIONS

(71) Applicant: Dropbox, Inc., San Francisco, CA (US)

(72) Inventors: Kavitha Radhakrishnan, San Jose, CA (US); Timo Mertens, Millbrae, CA (US); Neil Sethi, San Francisco, CA (US); David Stinnette, San Francisco, CA (US); Justin Hileman, San Francisco, CA (US); Adam LaFave, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 672 days.

(21) Appl. No.: 15/908,312

(22) Filed: Feb. 28, 2018

(65) Prior Publication Data

US 2019/0266573 A1 Aug. 29, 2019

(51) Int. Cl.
*G06Q 30/00* (2012.01)
*G06Q 10/10* (2012.01)
(Continued)

(52) U.S. Cl.
CPC ......... *G06Q 10/1095* (2013.01); *G06F 16/93* (2019.01); *G06N 20/00* (2019.01); *H04L 63/102* (2013.01); *H04L 65/403* (2013.01)

(58) Field of Classification Search
CPC ............................... G06Q 10/10; H04L 29/06
See application file for complete search history.

(56) References Cited

U.S. PATENT DOCUMENTS 5,899,979 A 5/1999 Miller et al.
6,085,205 A 7/2000 Peairs et al.
(Continued)

OTHER PUBLICATIONS

Buchanan, M.C., & Zellweger, P. (2005). Automatically generating consistent schedules for multimedia documents. Multimedia Systems, 1, 55-67. (Year: 2005).*

*Primary Examiner* — Joseph M Waesco
*Assistant Examiner* — Jay-Ming Wang
(74) *Attorney, Agent, or Firm* — Keller Jolley Preece

(57) ABSTRACT

The present disclosure relates to generating and utilizing digital associations between digital documents and digital calendar events based on determined content connections. For example, one or more embodiments suggest a digital document to a user for association with a digital calendar event based on content connections between the digital document and the digital calendar event. In particular, one or more embodiments determine a content connection based on document characteristics (e.g., document content and access characteristics) and calendar event characteristics (e.g., calendar content and historical meeting information). For example, the system can train a machine learning model to determine content connections based on document characteristics and calendar event characteristics. By associating digital documents with digital calendar events, the system can efficiently manage digital documents for participants, automatically generate new digital documents for calendar events, generate snippets for insertion within digital documents, and generate calendar event summaries and action items.

20 Claims, 20 Drawing Sheets

(51) Int. Cl.
*H04L 29/06* (2006.01)
*G06N 20/00* (2019.01)
*G06F 16/93* (2019.01)

(56) References Cited

U.S. PATENT DOCUMENTS

| | | | |
|---|---|---|---|
| 7,925,528 | B2 | 4/2011 | Biazetti et al. |
| 8,489,615 | B2 | 7/2013 | Dhara et al. |
| 9,015,301 | B2* | 4/2015 | Redlich .................. G06F 16/26 709/223 |
| 9,477,949 | B2 | 10/2016 | Myka et al. |
| 9,631,930 | B2* | 4/2017 | McGavran ............ G01C 21/00 |
| 9,665,597 | B2 | 5/2017 | Haitani et al. |
| 2008/0033957 | A1 | 2/2008 | Forstall et al. |
| 2010/0306265 | A1 | 12/2010 | Jones |
| 2013/0036117 | A1* | 2/2013 | Fisher .................. G06F 16/487 707/736 |
| 2014/0181219 | A1 | 6/2014 | Kalvass et al. |
| 2015/0261732 | A1 | 9/2015 | Kim et al. |
| 2016/0163007 | A1 | 6/2016 | Porter et al. |
| 2016/0259761 | A1 | 9/2016 | Laborczfalvi |
| 2016/0294894 | A1* | 10/2016 | Miller ............... G06F 16/24578 |
| 2016/0373456 | A1* | 12/2016 | Vermeulen ........... G06F 16/245 |
| 2017/0063908 | A1* | 3/2017 | Muddu .................. G06N 20/00 |
| 2017/0067747 | A1* | 3/2017 | Ricci .................... A61B 5/4809 |
| 2017/0078322 | A1* | 3/2017 | Seiver .................... H04L 41/12 |
| 2017/0124487 | A1* | 5/2017 | Szeto .................... G06N 20/00 |
| 2017/0171124 | A1* | 6/2017 | Brezina .............. G06F 16/9535 |
| 2017/0235848 | A1* | 8/2017 | Van Dusen ............ G06F 30/20 705/12 |
| 2017/0330109 | A1* | 11/2017 | Maughan ................ G06N 5/04 |
| 2018/0239959 | A1* | 8/2018 | Bui ....................... G06F 40/103 |
| 2018/0284735 | A1* | 10/2018 | Celia ................. G05B 23/0229 |
| 2018/0300324 | A1* | 10/2018 | Ziraknejad ........... G06N 20/00 |
| 2018/0329935 | A1* | 11/2018 | Mugali ................. G06N 5/046 |
| 2018/0337871 | A1* | 11/2018 | Matta .................... G06N 20/00 |
| 2019/0324435 | A1* | 10/2019 | Celia ....................... A01B 3/02 |

* cited by examiner

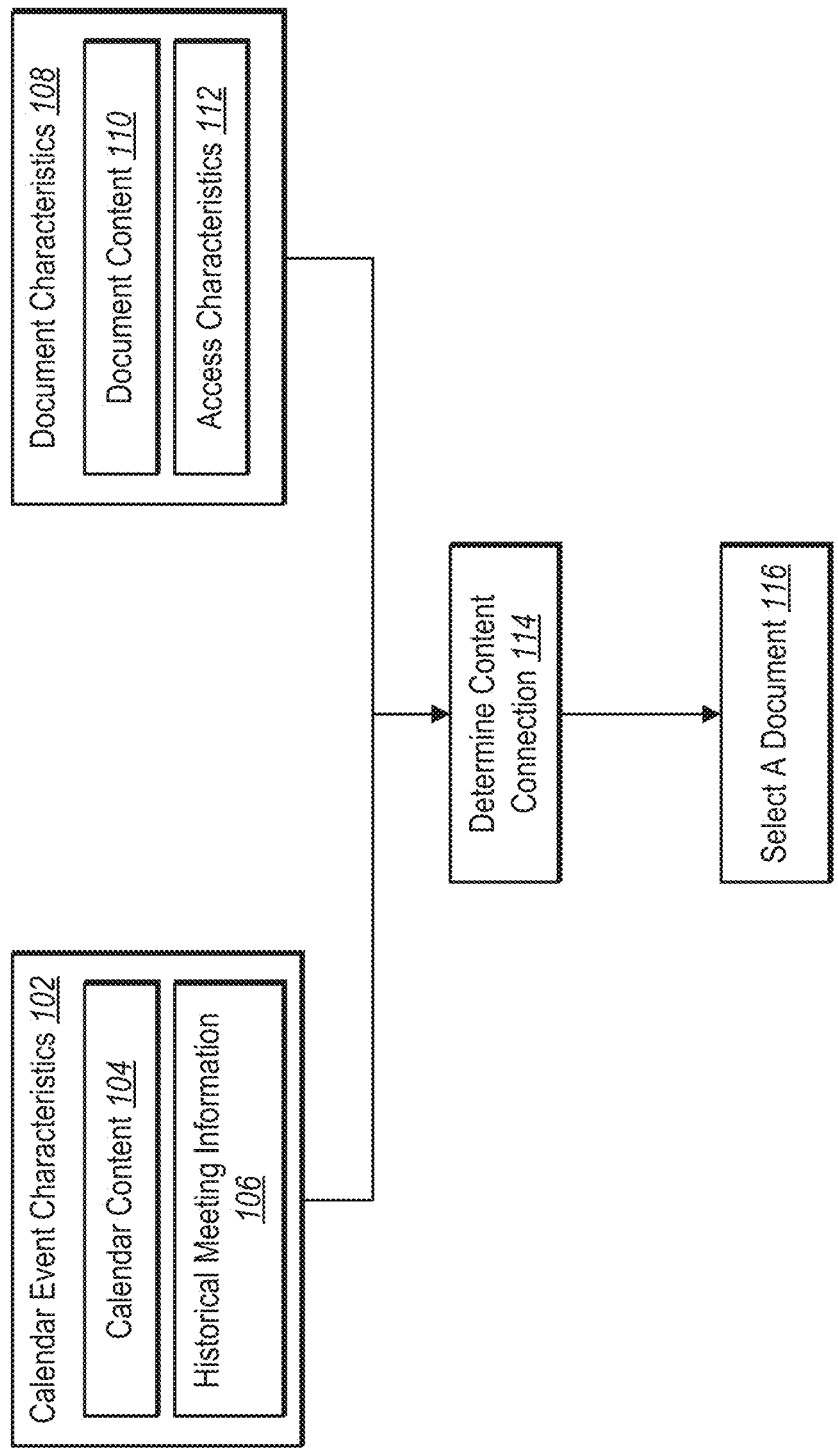

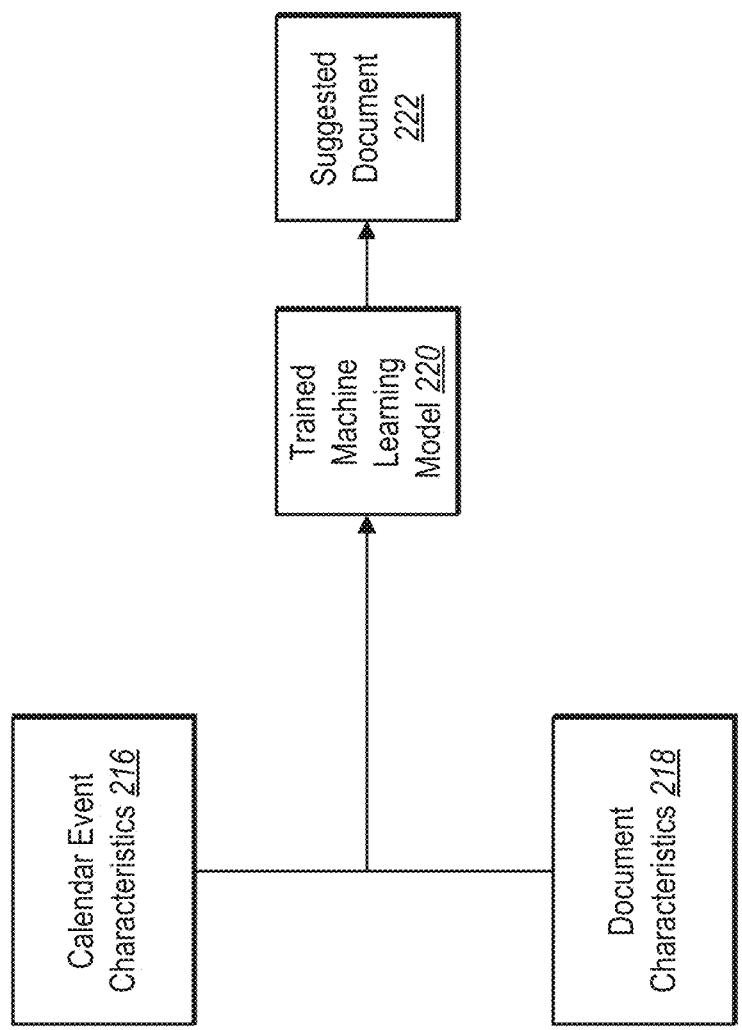

420 —

Filename: AlphaNotes.docx
Document Type: Word Document
Date Created: 1/2/2018, 10:00 AM
Last Date Modified: 1/3/2018, 4:32 PM
File Size: 9.12 MB } 422

Event: Alpha Team Weekly Report
Event Date: 1/14/2018
Event Time: 10:00 AM
Event Location: Conference Room 53A
Event Participants: Neil S, Sergio R, Mira N } 424

Fig. 4B

GENERATING DIGITAL ASSOCIATIONS BETWEEN DOCUMENTS AND DIGITAL CALENDAR EVENTS BASED ON CONTENT CONNECTIONS

BACKGROUND

Digital documentation has become ubiquitous in modern society, offering a number of benefits over paper documentation. For example, digital documentation drastically reduces the physical space required for storage, providing an invaluable benefit where maintenance of detailed records is desired. Further, systems incorporating digital documentation improve accessibility of the included documents. For example, a digital documentation system may provide access to a document through any electronic device even if that electronic device does not store the document locally. In particular, a digital documentation system may provide access to the document via an internet connection or other network connection. Additionally, digital documentation systems provide functionality for quickly locating a document or searching the contents of a document.

Despite these advantages, conventional digital documentation systems have several technological shortcomings that create inflexible, inaccurate, and inefficient operation. For example, although conventional digital documentation systems can provide improved access to digital documents, they are typically inflexible in providing access to the particular digital documents (or content) that satisfy dynamic user demands. In particular, conventional digital documentation systems are inflexible in that they generally only provide digital documents rigidly based on a specific search request for the documents from a user. Furthermore, to access content from a digital document, conventional systems generally require users to conduct a search query, open the document, and then perform a manual operation to utilize digital content in the document.

In addition, conventional digital documentation systems are often inaccurate in providing digital documents to users. For instance, because digital documentation systems rely heavily on user selection in disseminating digital documents, these systems frequently provide incorrect or inaccurate documents to other users or participants. Thus, for instance, users frequently attach irrelevant documents to calendaring items or circulate irrelevant documents via email in advance of (or during) a scheduled meeting.

Further, conventional digital documentation systems are inefficient. Indeed, conventional digital documentation systems utilize valuable computer processing resources in providing and disseminating irrelevant documents, conducting unnecessary digital document search queries, creating and sending unnecessary communications between participants (before, during, and after calendar events), repeatedly accessing unnecessary digital documents from multiple participants (e.g., to search for prior action items and content), and creating unnecessary duplication of digital documents and content.

SUMMARY

One or more embodiments described herein provide benefits and/or solve one or more of the foregoing or other problems in the art with systems, methods, and non-transitory computer readable storage media that improve computing systems by generating and utilizing associations between digital documents and digital calendar events based on determined content connections. In particular, one or more embodiments involve associating digital documents with digital calendar events based on content connections between the digital documents and the calendar events. For instance, the disclosed systems can determine content connections between digital documents and calendar events and automatically suggest the digital documents for the calendar event. The disclosed systems can utilize digital content connections between digital documents and calendar events to provide a variety of improvements to computing systems for managing digital documents and calendar events, including generating automatic digital document suggestions for calendar events, disseminating and sharing digital documents between calendar event participants, automatically transforming existing digital documents into new digital documents for calendar events, generating snippets for insertion within digital documents for calendar events, and automatically generating calendar event summaries and action items.

To illustrate, in one or more embodiments, a system identifies a digital calendar event that includes a plurality of participants. The system then analyzes a plurality of digital documents to determine whether one or more of those digital documents has a content connection with the calendar event. In one or more embodiments, the system determines whether there is a content connection between a digital document and the calendar event based on a comparison of the document content and the calendar content utilizing a trained machine learning model. Based on the determined content connection, the system then associates the digital document with the calendar event. In particular, by associating the digital document with the digital calendar event, the system makes the digital document accessible to the plurality of participants.

The following description sets forth additional features and advantages of one or more embodiments of the disclosed systems, computer readable storage media, and methods. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 1 illustrates a block diagram of the event document management system selecting a document to associate with a digital calendar event in accordance with one or more embodiments;

FIG. 2B illustrates a block diagram of a trained machine learning model used to determine a content connection in accordance with one or more embodiments;

FIG. 4B illustrates transforming a digital document by adding event metadata in accordance with one or more embodiments.

DETAILED DESCRIPTION

Figure 2A:
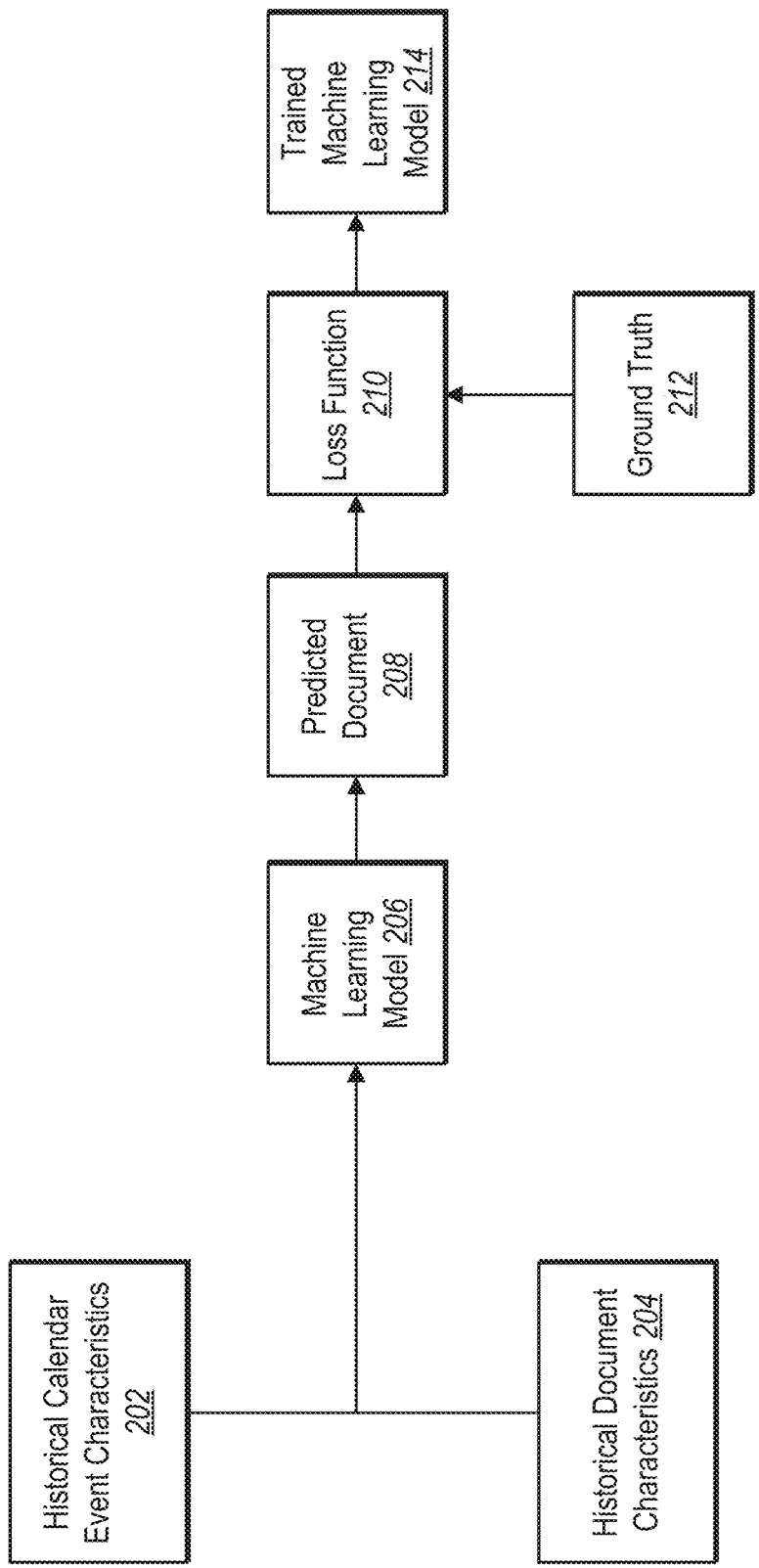
FIG. 2A illustrates a block diagram of the event document management system training a machine learning model to determine content connections in accordance with one or more embodiments.

One or more embodiments described herein include an event document management system for generating and utilizing digital associations between digital documents and digital calendar events by determining content connections. In one or more embodiments, the event document management system associates digital documents with digital calendar events based on content connections between the digital documents and the calendar events. The event document management system can thus provide a variety of improvements to computer systems prior to, during, and after the occurrence of digital calendar events. For instance, the event document management system can automatically generate suggestions for digital documents based on content connections with calendar events, can automatically generate digital documents pertinent to calendar events, can transform digital documents into digital documents with metadata associated with particular calendar events, can automatically share and disseminate pertinent digital documents to participants, can automatically generate snippets for insertion into digital documents, and can automatically generate calendar event summaries and action items based on digital documents associated with the calendar event.

To provide an exemplary illustration, in one or more embodiments, the event document management system identifies a digital calendar event having a plurality of participants and analyzes document characteristics of a plurality of digital documents to determine whether there is a content connection between a document of the plurality of digital documents and the digital calendar event. In particular, the event document management system compares one or more document characteristics (e.g., document content) to one or more calendar event characteristics (e.g., calendar content) utilizing a trained machine learning model to determine the content connection. Based on the determined content connection, the event document management system then associates the document with the digital calendar event so that the document becomes accessible to the participants of the calendar event.

As just mentioned, the event document management system can analyze document characteristics of a plurality of digital documents to determine whether there is a content connection between a document of the plurality of digital documents and the digital calendar event. The event document management system can analyze a variety of characteristics to determine a content connection. For example, the event document management system can determine a content connection by analyzing document content, calendar event content, access characteristics of the document, and/or historical meeting information associated with the digital calendar event.

In one or more embodiments, the event document management system determines the content connection between the digital document and the digital calendar event using a trained machine learning model. For example, the event document management system can train a machine learning model using training data associated with existing digital documents (e.g., historical document characteristics) and past digital calendar events (e.g., historical calendar event characteristics). Once trained, the event document management system analyzes the calendar event characteristics of an upcoming digital calendar event and the document characteristics of a digital document utilizing the trained machine learning model to determine whether a content connection exists.

As mentioned above, the event document management system can associate a digital document with a digital calendar event based on the determined content connection. In one or more embodiments, associating the digital document with the digital calendar event includes providing a link corresponding to the digital document with the digital calendar event so that the link is accessible through a digital calendar application of a participant. Similarly, the event document management system can associate a digital document with a calendar event by attaching a copy of the digital document to the digital calendar event. Moreover, in one or more embodiments, associating a digital document with a calendar event includes changing the permissions of the digital document to permit access to the plurality of participants of the calendar event and/or editing the metadata of the digital document to indicate the association.

As mentioned above, the event document management system can utilize content connections to suggest, disseminate, and/or create digital documents corresponding to a calendar event. Indeed, upon identifying a content connection, the event document management system can automatically provide suggestions (e.g., notifications) of digital documents for a calendar event (e.g., digital documents that a user may wish to associate with a calendar event). Moreover, the event document management system can automatically associate a digital document with a calendar event to allow other participants to access the digital documents. In addition, in some embodiments, the event document management system generates new digital documents based on digital documents associated with a calendar event. To illustrate, the event document management system can generate a new digital document that includes action items based on a previous digital document generated from a previous calendar event.

Furthermore, as mentioned above, the event document management system can also generate snippets for insertion into digital documents in relation to a calendar event. For instance, the event document management system can determine a content connection between a digital document and a calendar event and suggest a snippet (e.g., digital content with particular formatting, structure and/or outline) for adding content to the digital document. As outlined in greater detail below, the event document management system can identify snippets utilizing a trained machine learning model to identify snippets from previous digital documents of a particular user or a group of users (e.g., crowdsourcing).

Moreover, in one or more embodiments, the event document management system can utilize content connections to generate digital summaries and notifications for calendar events. Indeed, based on content connections between a digital document and a calendar event, the event document management system can identify action items, notes, dictations, and/or discussions from digital documents corresponding to a calendar event, generate digital summaries from the digital documents (e.g., digital summaries unique to individual participants), and disseminate the digital summaries and/or corresponding notifications.

The event document management system provides several advantages over conventional digital documentation systems. For example, by analyzing document characteristics to determine a content connection between a digital document and a digital calendar event and associating the digital document with the calendar event based on that connection, the event document management system improves flexibility of computing systems that manage digital documents and/or calendar events. In particular, the event document management system can suggest and provide access to a digital document that satisfies dynamic user needs (e.g., without a user request and/or specific search directed to the digital document). Rather, the event document management system can analyze a plurality of digital documents to determine which digital documents have a content connection with the digital calendar event.

In addition, the event document management system can also efficiently provide and suggest snippets to automatically and flexibly add digital content within a digital document. Indeed, the event document management system can analyze characteristics of a calendar event and characteristics of a digital document and flexibly suggest and provide an outline, format, and/or text for a portion (i.e., snippet) of the digital document Further, the event document management system can operate more accurately than conventional systems. Indeed, by identifying, suggesting, and/or providing digital documents based on content connections, the event document management system can reduce inaccurate digital documents disseminated for calendar events. Further, the event document management system can accurately, quickly, and efficiently assist users in identifying relevant digital documents for calendar events.

Additionally, compared to conventional systems, the event document management system can operate more efficiently. Indeed, the event document management system can reduce dissemination and storage of irrelevant digital documents, reduce user interactions and user-initiated search queries for identifying digital documents, reduce unnecessary communications between participants before, during, and after calendar events (e.g., as users send digital documents, ask for clarifications, identify action items, etc.), reduce unnecessary access to prior digital documents (e.g., to search for and reproduce action items or content from the digital documents), and reduce generation and storage of duplicate documents (e.g., multiple summaries or multiple copies of participant meeting notes).

As illustrated by the foregoing discussion, the present disclosure utilizes a variety of terms to described features and benefits of the event document management system. Additional detail is now provided regarding the meaning of these terms. As used herein, the term "digital calendar event," "calendar event," or "event" refers to a digital item comprising information regarding a meeting. In particular, a digital calendar event includes a digital item comprising information regarding a meeting that is scheduled, monitored, or tracked by a digital calendar application and accessible by a participant of the event. A digital calendar event can be stored in a variety of forms, including digital files of the following extensions: .ics, .ifb, iCal, or .vcs. A digital calendar event may refer to a digital item comprising information regarding an in-person meeting, a conference call, a video call, a presentation, a job interview, a birthday party, or a doctor's appointment.

Additionally, as used herein, the term "meeting" refers to an incident, episode, or occurrence involving one or more participants. In particular, a meeting refers to a real-world instance associated with a digital calendar event. For example, a meeting can include an in-person meeting, a conference call, a video call, a presentation, a job interview, a birthday party, or a doctor's appointment.

Further, as used herein, the term "participant" refers to a user of the event document management system. In particular, participant refers to an individual, company, business, group, other entity, or any combination of such that is included within a digital calendar event and can be a party to the associated meeting. For example, participant can include a co-worker, employee, supervisor, presenter, or job applicant.

Additionally, as used herein, the term "document characteristic" refers to a measurable or otherwise discernable attribute that refers to the composition of a digital document. In particular, document characteristics may refer to document content of a digital document or access characteristics of the digital document. As used herein, "document content" refers to data included in a digital document. For example, document content includes text, images, graphs, embedded videos, formatting, font, and text flow of a digital document. More specific examples of document content include a document title, document text, and a document timestamp. Further, as used herein, "access characteristics" refers to any measurable or otherwise discernable attribute relating to the access of a digital document. For example, access characteristics includes data regarding historical sharing of the digital document (e.g., which users the digital document has been shared with in the past), access credentials or permissions of various users (which users already have access to the digital document and/or have opened the digital document in the past), and data regarding historical access of the digital document (e.g., users who have accessed or edited the digital document in the past, the times at which the digital document has been accessed, etc.)

As used herein, the term "digital document" refers to any organization of digital data. In particular, digital document refers to data organized into a digital format and stored as one or more digital files. For example, digital document can include a word processing file, a digital spreadsheet, a PDF, a JPEG, a MP3 file, or a digital video file.

Further, as used herein, the term "content connection" refers to a similarity, relation, or correlation between a digital document and a digital calendar event. In particular, content connection refers to a similarity, relation, or correlation that exists between document characteristics of a digital document and calendar event characteristics of a digital calendar event. For example, content connection can include a digital document and a digital calendar event having the same or similar titles or description content.

As used herein, the term "calendar event characteristics" refer to a measurable or otherwise discernable attribute that refers to a digital calendar event. In particular, calendar characteristics may refer to calendar content or historical meeting information related to a digital calendar event. As used herein, "calendar content" refers to data included within or referring to a digital calendar event. In particular, calendar content includes text included within a calendar event (e.g., digital calendar event title, digital calendar event description, text, or messages of a calendar event); images included within a calendar event; dates, times, or locations of a meeting associated with a calendar event; contact information included within a calendar event (e.g., conference call numbers, collaboration spaces) invitee lists included within a calendar event, accepted lists included within a calendar event, and rejected lists included within a calendar event. Further, as used herein, "historical meeting information" refers to data describing the context surrounding a digital calendar event. In particular, historical meeting information refers to data indicating a relation between a digital calendar event and another digital calendar event. For example, historical meeting information includes data indicating that an event is part of a recurring event (e.g., the invitation is associated with an iteration of a weekly meeting) or a series of calendar events with similar participants.

Additionally, as used herein, the term "event metadata" refers to data describing (or defining) a digital calendar event. In particular, event metadata refers to a set of data describing a digital calendar event included within a digital calendar application. For example, event metadata can include data referring to a title, a description, a date, or a participant list of a digital calendar event.

Referring now to the figures, FIG. 1 illustrates a block diagram for selecting a digital document to associate with a digital calendar event in accordance with one or more embodiments of the event document management system. As shown in FIG. 1, the event document management system associates digital documents with digital calendar events based on content connections between the digital documents and the calendar events (e.g., without requiring user input). Though the event document management system can analyze a plurality of digital documents to determine which digital documents have a content connection with the digital calendar event, for simplicity, FIG. 1 discusses a single digital document.

As can be seen in FIG. 1, the event document management system uses calendar event characteristics 102 of a digital calendar event and document characteristics 108 of a digital document to determine content connection 114 between the digital document and the digital calendar event. As shown in FIG. 1, calendar event characteristics 102 includes calendar content 104 and historical meeting information 106. Additionally, document characteristics 108 includes document content 110 and access characteristics 112.

In relation to FIG. 1, the event document management system can determine a content connection between a digital document and a digital calendar event based on any combination of calendar event characteristics 102 and document characteristics 108. In particular, the event document management system can determine a content connection based on calendar content 104 and document content 110, calendar content 104 and access characteristics 112, historical meeting information 106 and document content 110, historical meeting information 106 and access characteristics, or any other combination involving one or more calendar event characteristics 102 and one or more document characteristics 108. For example, the event document management system can determine a content connection based on the title of the calendar event (i.e., calendar content 104) and the title of the digital document (i.e., document content 110). As another example, the event document management system can determine a content connection based on a date indicating that a digital document was created on the first Monday of a particular month (i.e., document content 110) and data indicating that an upcoming calendar event is part of a recurring meeting that occurs on the first Monday of each month (i.e., historical meeting information 106).

As shown in FIG. 1, the event document management system can also determine a content connection based on access characteristics 112. Some examples of access characteristics 112 that can be used to determine a content connection between a digital document and a digital calendar event having a plurality of participants includes the history of sharing the digital document among the plurality of participants, whether some of the participants already have access to the digital document (e.g., some participants have access credentials to a protected digital document), whether any of the participants exhibit a pattern of opening the digital document at a time related to the calendar event (e.g., always opens the digital document an hour before a recurring weekly meeting), whether several of the participants have opened the digital document at some point in time, general access time of the digital document by one or more of the participants, and whether one or more of the participants have edited the digital document in the past.

In one or more embodiments, the event document management system determines that a content connection exists using a string comparison. In particular, the event document management system compares a string representing calendar event characteristics 102 and a string representing document characteristics 108 to determine whether the two strings are the same. For example, as mentioned, the event document management system can determine a content connection between a digital document and a digital calendar event by comparing calendar content 104 and document content 110. In particular, document content 110 can include a document title or document text and calendar content 104 can include a digital calendar event title and a digital calendar event description. The event document management system can compare the document content 110 and the calendar content 104 to determine a content connection. For example, If a string representing the digital calendar event title and a string representing the digital document title are the same, the event document management system can determine that there is a content connection between the digital calendar event and the digital document. Alternatively, or additionally, the event document management system can determine a content connection exists if the two strings meet a threshold of similarity. For example, if the date of a digital calendar event is represented by numerals and slashes (e.g., 1/10/18) and the same date is represented in a digital document by letters and numbers (e.g., Jan. 10, 2018), the event document management system can determine that the two strings are similar enough that a content connection exists.

In one or more embodiments, the event document management system determines a content connection by generating a content connection score between digital documents and digital calendar events. For instance, in one or more embodiments, the event document management system identifies individual connections between calendar event characteristics and document characteristics and provides each connection a value that adds to the overall content connection score for the digital document analyzed. In one or more embodiments, the event document management system provides each connection with the same value and the overall content connection score depends on the number of connections made between calendar event characteristics and document characteristics. In one or more alternative embodiments, the event document management system provides each connection with a value that correlates to a determined importance of that connection in determining overall relevance of the digital document to the digital calendar event. For example, event document management system can provide a first value to a connection where the participant lists of a digital document and digital calendar event are the same and a second higher value to a connection where the titles of the digital document and the event match, because a group of participants may be included within several different unrelated events where it is more likely that a digital document with a title matching that of the calendar event is relevant to that specific event.

In one or more embodiments, the event document management system then ranks the plurality of digital documents based on the overall content connection score associated with each of the digital documents. The event document management system can then select the digital document having the highest score (or any number of digital documents having the highest scores) to provide as a suggestion to a participant to associate the digital document with the digital calendar event. In one or more alternative embodiments, the event document management system suggests all digital documents having an overall content connection score that satisfies a content connection threshold. The content connection threshold can be determined by the participant or it can be determined automatically by the event document management system.

In one or more embodiments, the event document management system determines whether a content connection exists using a machine learning model (e.g., as discussed below with reference to FIG. 2).

As shown in FIG. 1, the event document management system can select the document 116 based on the determined content connection. In particular, the event document management system can select the document 116 to associate with the calendar event. In one or more embodiments, the event document management system automatically associates the digital document with the digital calendar event, providing access to the participants of the event. In or more alternative embodiments, the event document management system presents a suggestion (either automatically or in response to a request to see suggested documents) to a participant of the calendar event to associate the selected document with the event.

As just mentioned, in one or more embodiments, the event document management system determines a content connection utilizing a trained machine learning model. FIG. 2A illustrates a block diagram of the event document management system training a machine learning model to determine content connections in accordance with one or more embodiments. As used herein, a "machine learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to a neural network (e.g., a convolutional neural network or deep learning), a decision tree (e.g., a gradient boosted decision tree), association rule learning, inductive logic programming, support vector learning, Bayesian network, regression-based model, principal component analysis, or a combination thereof.

As shown in FIG. 2A, the event document management system trains a machine learning model using historical calendar event characteristics 202 and historical document characteristics 204. In particular, historical calendar event characteristics 202 include data regarding past digital calendar events (i.e., calendar events associated with meetings that have already occurred), and historical document characteristics 204 include data regarding digital documents in existence prior to the occurrence of meetings associated with the past digital calendar events. In one or more embodiments, the event document management system obtains historical calendar event characteristics 202 and historical document characteristics 204 from a database storing such information. For example, the event document management system can extract historical calendar event characteristics 202 from the digital calendar application in which the past digital calendar events were scheduled and monitored or from a separate database. Additionally, the event document management system can extract historical document characteristics 204 from a document database.

As shown in FIG. 2A, the event document management system provides historical calendar event characteristics 202 associated with a past digital calendar event and historical document characteristics 204 associated with digital documents in existence prior to the occurrence of the past calendar event to machine learning model 206 to determine predicted document 208. In particular, the machine learning model 206 analyzes historical calendar event characteristics 202 and historical document characteristics 204 and predicts that the predicted document 208 has a content connection with a particular calendar event.

As shown in FIG. 2A, the event document management system can train machine learning model 206 by comparing predicted document 208 to ground truth 212. In particular, the event document management system compares predicted document 208 and ground truth 212 by applying loss function 210. Loss function 210 indicates a difference (or measure of error) between predicted document 208 and ground truth 212. In particular, loss function 210 determines the cost (i.e., loss in value) caused by machine learning model 206 based on the difference between an estimated value (i.e., predicted document 208) and the true value (i.e., ground truth 212). The event document management system can utilize a variety of loss functions, including squared error loss function, 0-1 indicator function, or cross entropy loss function.

The event document management system can determine ground truth 212 in a variety of ways. For example, in one or more embodiments, ground truth 212 indicates whether predicted document 208 was actually relevant (e.g., associated with) a digital calendar event. The event document management system can determine ground truth 212 by analyzing historical data to determine whether the predicted document 208 was ever associated with the digital calendar event predicted by machine learning model 206. For example, the event document management system can determine whether the predicted document 208 was added to the calendar event or utilized during the meeting associated with the calendar event. The event document management system can then utilize this determination as ground truth 212.

In addition to historical observations of digital documents associated with calendar events, in one or more embodiments, the event document management system can determine ground truth 212 based on user input. For instance, the event document management system can ask a participant whether a particular digital document is relevant to a particular event and generate ground truth 212 based on the response (e.g., predicted document 208 has a content connection based on an affirmative response).

Furthermore, the event document management system can continuously generate ground truth values as it predicts content connections between digital documents and calendar events. For example, upon predicting that a content connection exists between a digital document and a calendar event, the event document management system can suggest the digital document to a participant of the calendar event. The event document management system can then utilize the participant's response as a new ground truth value (e.g., if the participant accepts the suggestion or if the participant rejects the suggestion, the event document management system can utilize the result as a ground truth to train the machine learning model).

As mentioned above, the event document management system can utilize loss function 210 to compare ground truth 212 and predicted document 208 and train machine learning model 206. Specifically, in one or more embodiments, the event document management system uses the results of loss function 210 to improve machine learning model 206. In particular, the event document management system can modify internal parameters of the machine learning model (e.g., through back-propagation) to minimize loss function 210. By repeatedly predicting a content connection between a digital document and a calendar event, comparing the predicted document with ground truth via a loss function, and modifying internal parameters (e.g., weights within layers of a neural network), the event document management system can learn significant features from calendar event characteristics 102 and document characteristics 108 and how those features impact the relevance (i.e., content connection) of a digital document to a digital calendar event. As shown in FIG. 2A, in this manner, the event document management system generates trained machine learning model 214.

As discussed earlier, the event document management system can also utilize a trained machine learning model to identify (e.g., select) digital documents having a content connection with a digital calendar event. FIG. 2B illustrates a block diagram representing one or more embodiments in which the event document management system selects a digital document to suggest to a participant for association with a digital calendar event using a trained machine learning model. In one or more embodiments, trained machine learning model 220 shown in FIG. 2B is the same as trained machine learning model 214 illustrated in FIG. 2A. As shown in FIG. 2B, the event document management system analyzes calendar event characteristics 216 and document characteristics 218 via the trained machine learning model 220. In particular, calendar event characteristics 216 includes the calendar event characteristics (e.g., calendar content and historical meeting information) associated with an upcoming digital calendar event. Additionally, document characteristics 218 includes the document characteristics (e.g., document content and accessibility characteristics) associated with each of a plurality of existing digital documents.

As shown in FIG. 2B, trained machine learning model 220 outputs suggested document 222. In particular, by providing calendar event characteristics 216 and document characteristics 218 to trained machine learning model 220, the event document management system determines which digital document, out of the plurality of digital documents, has a content connection with the digital calendar event (i.e., suggested document 222). In particular, the trained machine learning model 220 can analyze the significant features of event characteristics 216 and document characteristics 218 as learned during training to determine a digital document to suggest.

Upon identifying suggested document 222, the event document management system can also associate suggested document 222 with a corresponding calendar event. For instance, in one or more embodiments, the event document management system automatically associates suggested document 222 with the digital calendar event based on the determined content connection. In some embodiments, the event document management system provides, to a participant of the digital calendar event, a suggestion (either automatically or in response to a request to view suggested documents) to associate suggested document 222 with the digital calendar event.

In one or more embodiments, suggested document 222 includes multiple digital documents. In other words, trained machine learning model 220 determines that more than one digital document from the plurality of digital documents has a content connection with the digital calendar event. In one or more embodiments, the event document management system suggests to the participant all digital documents with a determined content connection be associated with the digital calendar event. In some embodiments, the event document management system suggests a subset of the digital documents determined to have a content connection. For example, the event document management system can suggest the digital document determined to have the strongest content connection with the digital calendar event or the top three digital documents having the strongest connection for the purpose of providing digital documents having the most relevance to the event. In one or more embodiments, the event document management system can suggest all digital documents satisfying a content connection threshold.

For situations where multiple digital documents may be found to have a content connection with a digital calendar event, the event document management system can use trained machine learning model 220 to provide a score to each digital document from the plurality of digital documents representing the strength (or probability) of a content connection of that digital document to the calendar event. In particular, the event document management system can train machine learning model 206 from FIG. 2A to determine a content connection score (or probability) for each digital document analyzed. For example, if trained machine learning model 220 is a neural network classifier, the event document management system can strip away the output layer of the neural network (and analyze the underlying feature vector) to determine a probability of a particular classification (e.g., probability of a content connection). The event document management system can then utilize the probability of the classification to compare the probability of a content connection for various digital documents.

Although FIGS. 2A-2B illustrate training and using a machine learning model to generate predicted digital documents, the event document management system can similarly train and use a machine learning model to predict digital calendar events. In particular, the event document management system can use a trained machine learning model to select a calendar event that can be suggested to a participant of the calendar event for association with a particular digital document accessed by that participant. Indeed, the event document management system can use a trained machine learning model to analyze calendar event characteristics and document characteristics to determine content connections between digital documents and digital calendar events regardless of whether the content connections are used to suggest digital documents or digital calendar events.

Figure 3A:
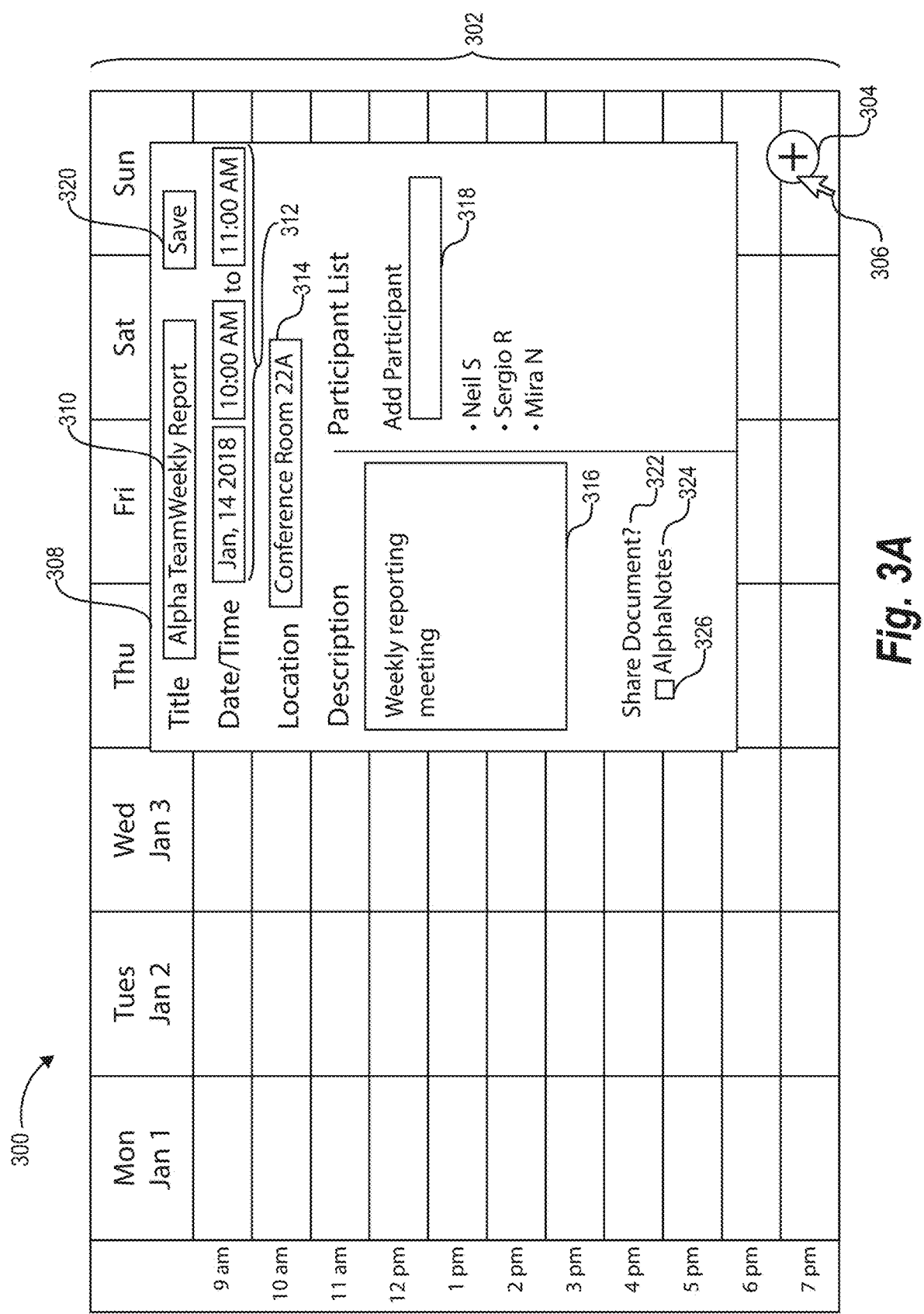
FIGS. 3A-3C each illustrate an example user interface in which the event document management system allows a user to associate a digital document with a digital calendar event in accordance with one or more embodiments.

As mentioned, the event document management system can provide suggested digital documents to associate with a digital calendar event based on a determined content connection. For example, FIG. 3A illustrates example user interface 300 in which the event document management system provides a suggestion to a participant of a digital calendar event to associate a digital document with the event in accordance with one or more embodiments. In particular, user interface 300 is a user interface corresponding to a digital calendar application. As can be seen in FIG. 3A, user interface 300 includes calendar display 302 and event add button 304. In particular, calendar display 302 displays a grid where the columns represent days of the week (with their associated dates) and the rows display the time of day. Though FIG. 3A shows calendar display 302 displaying days in weekly increments, alternative embodiments can display daily increments, monthly increments, or any other increment selected by the participant or the event document management system.

Add event button 304 provides functionality through which a participant can add an event to the digital calendar application. In one or more embodiments, when a participant clicks on add event button 304 with cursor 306, user interface 300 opens add event interface 308 where a participant can add information to generate a new digital calendar event.

As illustrated in FIG. 3A, add event interface 308 includes several text fields in which a participant can enter text about the digital calendar event. For example, add event interface 308 can include title field 310, date/time field 312, location field 314, description field 316, and participant field 318. It should be noted, however, that add event interface 308 can include any additional or alternative field deemed necessary or helpful to the generation of a new digital calendar event. In one or more embodiments, the text entered into the various text fields provided by add event interface becomes part of calendar content 104 described with reference to FIG. 1.

Additionally, add event interface 308 includes save button 320. In particular, save button 320 allows a participant to generate a new digital calendar event or save changes to an existing calendar event. In particular, when adding a new digital calendar event to the digital calendar application, selecting save button 320 saves the information provided in add event interface 308 and generates a new digital calendar event which can be accessed through user interface 300. In particular, when a new digital calendar event is generated, the event document management system adds a representation of the digital calendar event (e.g., the title to the event) to calendar display 302 corresponding to the date and time of the event.

As shown in FIG. 3A, add event interface 308 also includes document suggestion 322. In particular, document suggestion 322 includes suggested document 324 and acceptance option 326. In particular, suggested document 324 reflects a digital document selected for association with the digital calendar event (i.e., "Alpha Team Weekly Report") entered in the add event interface 308. The event document management system compares the characteristics of the digital calendar event (e.g., the contents in the add event interface 308 and/or historical event information) and documents characteristics of a plurality of digital documents and identifies a content connection with suggested document 324 (i.e. the digital document entitled "Alphallotes").

Acceptance option 326 provides an option to associate suggested document 324 with the digital calendar event. In particular, if a participant selects acceptance option 326 (e.g., checks the box), the event document management system can associate suggested document 322 with the newly generated (or edited) digital calendar event. In one or more embodiments, document suggestion 322 includes multiple suggested documents, allowing a user to select all, some, or none of the digital documents for association with the digital calendar event.

Figure 3B:
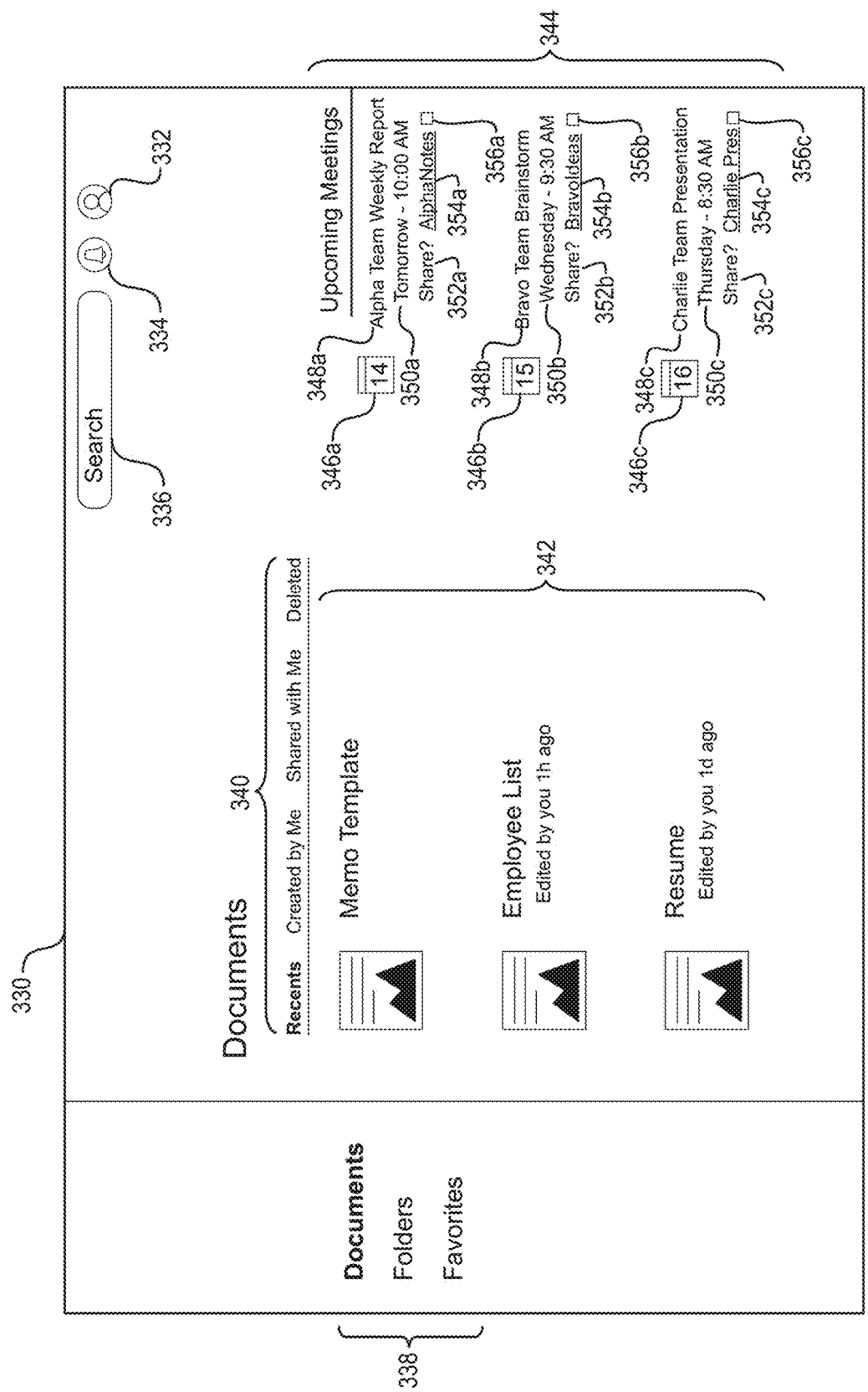

The event document management system can provide document suggestions via a variety of user interfaces presented at a variety of different times. For example, FIG. 3B illustrates example user interface 330 of one or more embodiments in which the event document management system provides a suggestion to a participant of a digital calendar event to associate a digital document with the digital calendar event. In one or more embodiments, user interface 330 can represent an interface for an online content management system (e.g., one in which the event document management system operates) where a user can search for, edit, view, organize, delete, or create digital documents. In particular, user interface 330 includes user profile option 332, notifications option 334, search bar 336, organizational options 338, filter options 340, digital object display menu 342, and upcoming events display bar 344.

As mentioned above, user interface 330 includes upcoming events display bar 344. In particular, upcoming events display bar 344 provides, via user interface 330, information regarding existing digital calendar events that have not yet occurred and in which the user is a participant. In one or more embodiments, upcoming events display bar 344 displays one or more of the most imminent digital calendar events. Alternatively, upcoming events display bar 344 can display upcoming digital calendar events determined to have a particular significance to the user (e.g., digital calendar events with associated meetings where the user will make a presentation or digital calendar events with associated meetings where the user will lead).

As shown in FIG. 3B, upcoming events display bar 344 displays meeting icons 346a-346c, meeting titles 348a-348c, meeting times 350a-350c, and document suggestions 352a-352c. Notably, document suggestions 352a-352c include digital documents automatically selected by the event document management system to suggest for association with respective digital calendar events.

As shown in FIG. 3B, document suggestions 352a-352c include one or more suggested documents (e.g., suggested documents 354a-354c) and an acceptance option (e.g., acceptance options 356a-356c). In particular, the event document management system identifies the suggested documents 354a-354c by comparing document characteristics and digital calendar event characteristics (as described above).

In one or more embodiments, suggested documents 354a-354c can include a link that, if selected by the participant, opens the suggested document or provides a preview or short summary of the suggested document. Additionally, acceptance options 356a-356c, if selected by the participant, associates suggested documents 354a-354c with their respective digital calendar event.

Although FIGS. 3A-3B illustrate two exemplary user interfaces for suggesting digital documents, the event document management system can provide suggested digital documents based on content connections with digital calendar events in a variety of other contexts. For example, a user of user interface 330 can search for digital documents using search bar 336. In one or more embodiments, when a user searches for a digital document during, or close to, the time of a meeting associated with the digital calendar event, the event document management system causes a digital document relevant to the digital calendar event to show up in the search results. Indeed, in one or more embodiments, when clicking inside search bar 336 (i.e., before even initiating a search) during or close to the meeting associated with the calendar event, the event document management system can present a digital document relevant to the event to the user.

Figure 3C:
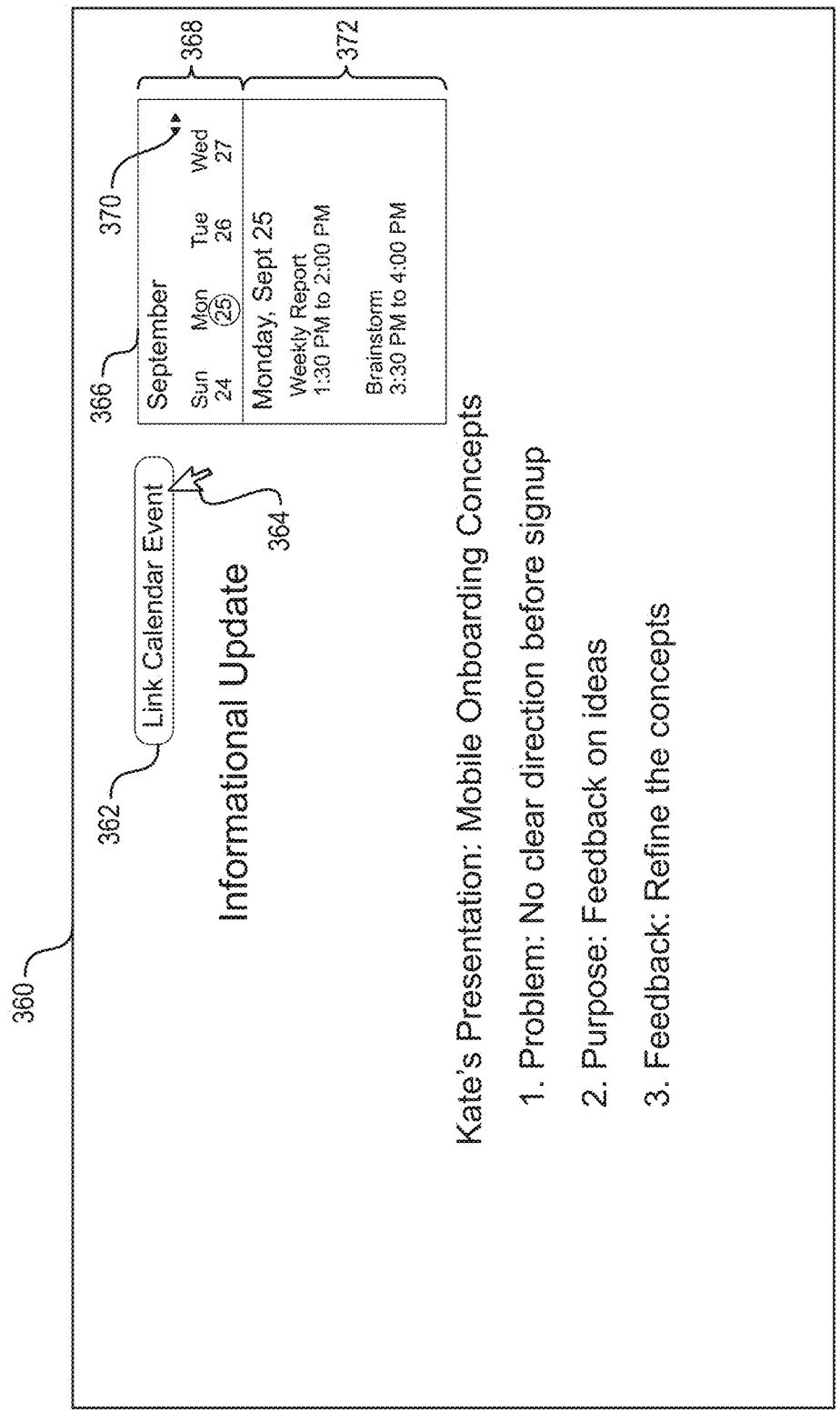

Although FIGS. 3A-3B illustrate generating a suggestion for a digital document to associate with a calendar event (e.g., within a user interface for generating or displaying calendar events), the event document management system can also generate a suggestion for a calendar event (e.g., from within a user interface for drafting or manipulating digital documents). For example, FIG. 3C illustrates document user interface 360 for viewing and editing a digital document. As shown, document user interface 360 provides options to associate the digital document with a digital calendar event. For example, in one or more embodiments, document user interface 360 includes link event button 362. In particular, when a user selects link event button 362 using cursor 364, document user interface 360 provides event selection interface 366. It should be noted that, though the present discussion describes the action of selecting link event button 362 with cursor 364, selection of link event button 362 can be accomplished using any suitable method of selection (e.g., touch gesture, key pad, etc.).

As shown in FIG. 3C, when a user selects link event button 362, the event document management system provides one or more suggested digital calendar events with which the user can associate the digital document. Specifically, the event document management system identifies one or more digital calendar events having a content connection with the digital document and suggests the identified digital calendar events. Although FIG. 3C illustrates link calendar event button 362, in other embodiments, the event document management system can automatically provide suggestions for digital calendar events within the document user interface upon identifying a content connection between the digital document and a digital calendar event.

In one or more embodiments, event selection interface 366 also includes date selection area 368 and event selection area 372. In particular, date selection area 368 displays a calendar view of days that may be selected to find particular digital calendar events scheduled for those days. Additionally, date selection area 368 can include scroll buttons 370, which can be used to scroll through dates displayed in the calendar view.

In addition to the suggestions illustrated in FIGS. 3A-3C, in one or more embodiments, the event document management system provides, to a participant, an option of manually selecting a digital document and associating the digital document with a digital calendar event. For example, one or more embodiments can provide a list of digital documents to the participant and associate a digital document with a digital calendar event in response to detecting the participant's action of selecting the digital document from the list of digital documents and dragging the digital document to the calendar event interface (i.e., drag-and-drop). Alternatively, the event document management system provides the participant an option of opening a file navigation window from a calendar event interface and selecting (e.g., double clicking) a digital document to associate with the event. A participant can drag and drop or otherwise associate a digital document with a digital calendar event before, during, or after occurrence of the calendar event.

Thus, the event document management system allows users to quickly and efficiently associate digital documents with digital calendar events. Indeed, whether generating a digital calendar event, generating a digital document, navigating a list of digital documents, or simply navigating a user interface displaying calendar events, the event document management system can identify content connections and associate digital calendar events and digital documents.

As mentioned, in addition to suggestions, the event document management system can also associate a digital document with a calendar event in a variety of ways. For instance, in one or more embodiments, the event document management system associates a digital document with a calendar event by providing access to the digital document to the participants of the digital calendar event. In particular, before a digital document is associated with a calendar event, one or more of the participants of the event may not have access to the digital document. For example, the digital document may be stored locally on a user's computer. Alternatively, the digital document may be stored on a remote server where access is limited to particular users with access credentials. Accordingly, in one or more embodiments, associating a digital document with a digital calendar event includes changing the permissions (e.g., modifying access credentials) of the digital document to allow access to the participants of the calendar event.

Figure 4A:
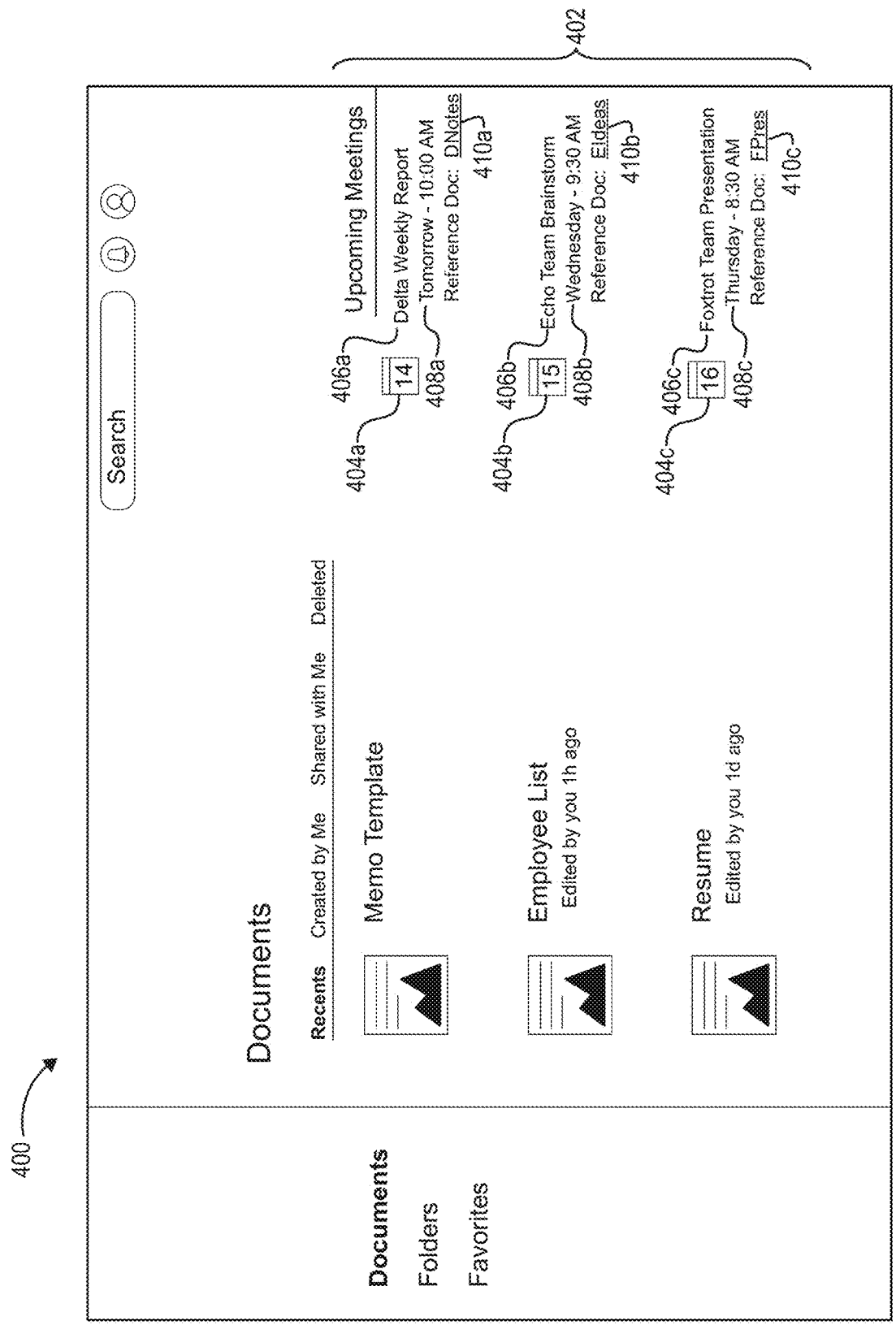
FIG. 4A illustrates an example user interface providing a link to a digital document associated with a digital calendar event in accordance with one or more embodiments.

Furthermore, in one or more embodiments, the event document management system associates a digital document with a digital calendar event by modifying access credentials and adding a link to a digital calendar event. For example, FIG. 4A illustrates user interface 400 in which the event document management system provides a link to a digital document associated with a digital calendar event in accordance with one or more embodiments. In particular, user interface 400 is similar to user interface 330 of FIG. 3B. As shown, upcoming events display bar 402 provides for display, information regarding existing digital calendar events that have not yet occurred and in which the user is a participant. In one or more embodiments, upcoming events display bar 402 displays one or more of the most imminent digital calendar events. Alternatively, upcoming events display bar 402 can display upcoming digital calendar events determined to have a particular significance to the user (e.g., events where the user will make a presentation or events where the user will conduct).

As shown in FIG. 4A, upcoming events display bar 402 displays meeting icons 404a-404c, meeting titles 406a-406c, meeting times 408a-408c, and associated documents 410a-410c. As shown in FIG. 4A, in one or more embodiments, associated documents 410a-410c include a link to digital documents that the event document management system associated with the respective digital calendar event. In particular, when a participant of the digital calendar event selects the link, the event document management system provides the digital document to the participant. For example, when a participant selects the link, the event document management system can locate the digital document from within a database (e.g., a database stored at a remote server) and provide the digital document to the participant.

In one or more alternative embodiments, the event document management system provides a copy of the associated digital document. In particular, the event document management system can attach the digital document to the associated digital calendar event so that the digital document is embedded within upcoming events display bar 402. Upon detecting selection of the attached document, the event document management system can provide the participant with the option of previewing the digital document, opening the digital document using an appropriate application, or downloading the digital document onto local memory.

Additionally, or alternatively, the discussion with regards to upcoming events display bar 402 applies to other user interfaces as well. In particular, other user interfaces that display digital calendar events may also provide a link to an associated digital document or a copy of the digital document may be embedded in the display of the calendar event. For example, if a participant of a digital calendar event opened the calendar event through the digital calendar application on which the event is scheduled, event document management system can provide a link to the digital document within the interface displaying the details of the calendar event. Additionally, or alternatively, the event document management system can provide a copy of the digital document for the participant to preview, open, or download to local storage.

In one or more embodiments, the event document management system associates a digital document with a digital calendar event by modifying metadata of the digital calendar event. Indeed, by modifying metadata of the digital calendar event, the event document management system can rapidly and efficiently search for, identify, catalogue, organize, and utilize digital documents in relation to digital calendar events. For example, FIG. 4B illustrates one or more embodiments in which the event document management system associates a digital document with a digital calendar event using the metadata of the digital document.

In particular, FIG. 4B illustrates digital document metadata 420, which can be edited to indicate an association with a digital calendar event. For example, when the event document management system associates a digital document with a digital calendar event, the event document management system can add event metadata to digital document metadata 420. In particular, digital document metadata 420 can include document detail metadata 422 and event metadata 424. In particular, document detail metadata 422 can include details regarding the digital document such as file name, document type, date created, last date modified, file size, etc. Additionally, event metadata 424 can include details regarding the associated digital calendar event, including event name, event date, event start time, event location, participant list, etc.

In one or more embodiments, the event document management system uses the content of the digital calendar event (e.g., calendar content 104) or any other calendar event characteristics to generate event metadata 424. In one or more embodiments, the event document management system can associate a digital document with more than one digital calendar event. Consequently, the event document management system can add event metadata for each calendar event to digital document metadata 420.

In one or more embodiments, associating a digital document with a digital calendar event by adding event metadata (e.g., event metadata 424) to the metadata of the digital document (e.g., digital document metadata 420) allows the event document management system to associate the digital document with the calendar event at any time relative to the occurrence of the meeting associated with the digital calendar event. In particular, the event document management system can associate the digital document with the digital calendar event before the occurrence meeting associated with the digital calendar event (as discussed above) or during or after the occurrence of the meeting. Additionally, using metadata to associate a digital document with a calendar event allows the event document management system to associate any digital document with a calendar event, even if that digital document is made outside the event document management system and even if the digital document was made without the purpose of associating the digital document with the event. Accordingly, the event document management system can transfer any digital document for utilization as part of the event document management system and for utilization as part of a digital calendar event.

The event document management system can perform a variety of functions by adding event metadata to a digital document. For example, a participant searching for a particular digital document can perform a search for the digital document using search terms included within the event metadata. In particular, a participant of a digital calendar event can initiate a search for a digital document associated with the calendar event by entering text included within event metadata (e.g., event name, event date, event start time, event location, participant list, etc.). In response, the event document management system can provide either a link to or a copy of the digital document. Indeed, in one or more embodiments, a participant can select a historical or future digital calendar event, and the event document management system can perform a search for and provide any digital documents associated with the digital calendar event.

Additionally, in one or more embodiments, the event document management system can use event metadata of a digital document to determine that the meeting associated with the digital calendar event is occurring or is about to occur. Consequently, the event document management system can recommend the digital document to a participant of the calendar event. For example, the event document management system can provide a reminder notification of the upcoming digital calendar event and provide a link to or copy of the associated digital document within the reminder notification.

As mentioned above, the event document management system can associate a digital document with a digital calendar event at any time relative to the occurrence of the meeting associated with the digital calendar event. Indeed, as previously illustrated in FIGS. 3A-3C the event document management system can suggest and associate a digital document with a digital calendar event prior to a digital calendar event or during creation of a digital document. In addition, the event document management system can associate a digital document with a calendar event during the occurrence of the meeting associated with the digital calendar event. For example, in one or more embodiments, when a participant of the calendar event opens a new digital document during a meeting, the event document management system provides a suggestion to the participant that the new digital document be associated with the calendar event. Moreover, the event document management system can provide other digital documents that have already been associated with the calendar event. Similarly, as participants add digital content to digital documents (e.g., action items or notes), the event document management system can identify content connections between the digital documents already associated with the event and additional digital documents. Accordingly, the event document management system can suggest additional digital documents during a digital calendar event based on additional content connections.

To illustrate, if a participant begins to insert content in a new digital document that is similar to content included in an existing digital document, the event document management system can provide the existing digital document to the participant whether or not the existing digital document has been associated with the event. If the existing digital document has not already been associated with the calendar event, the event document management system can suggest that the digital document be associated with the event to the participant.

In addition to suggesting and providing digital documents, in one or more embodiments, the event document management system also generates digital documents for a digital calendar event. In particular, the event document management system can generate or modify a digital document based on an existing digital document associated with a digital calendar event. For example, by associating a digital document with a recurring calendar event, the event document management system can leverage the contents of a digital document associated with a past calendar event to generate (or modify) a digital document associated with an upcoming or occurring calendar event.

To illustrate, in one or more embodiments, the event document management system determines that a digital document is associated with a previous (e.g., first) iteration of a digital calendar event. Consequently, the event document management system extracts content (e.g., text or an action item) from the digital document associated with the previous iteration of the event to include within a new digital document associated with a subsequent (e.g., second) iteration of the recurring event. In one or more embodiments, in recognizing that a digital calendar event is part of a series of recurring events (e.g., by analyzing historical meeting information 106), the event document management system automatically generates a digital document for the subsequent iteration of the recurring event and includes the content from the digital document associated with the previous iteration of the recurring event.

Figure 5A:
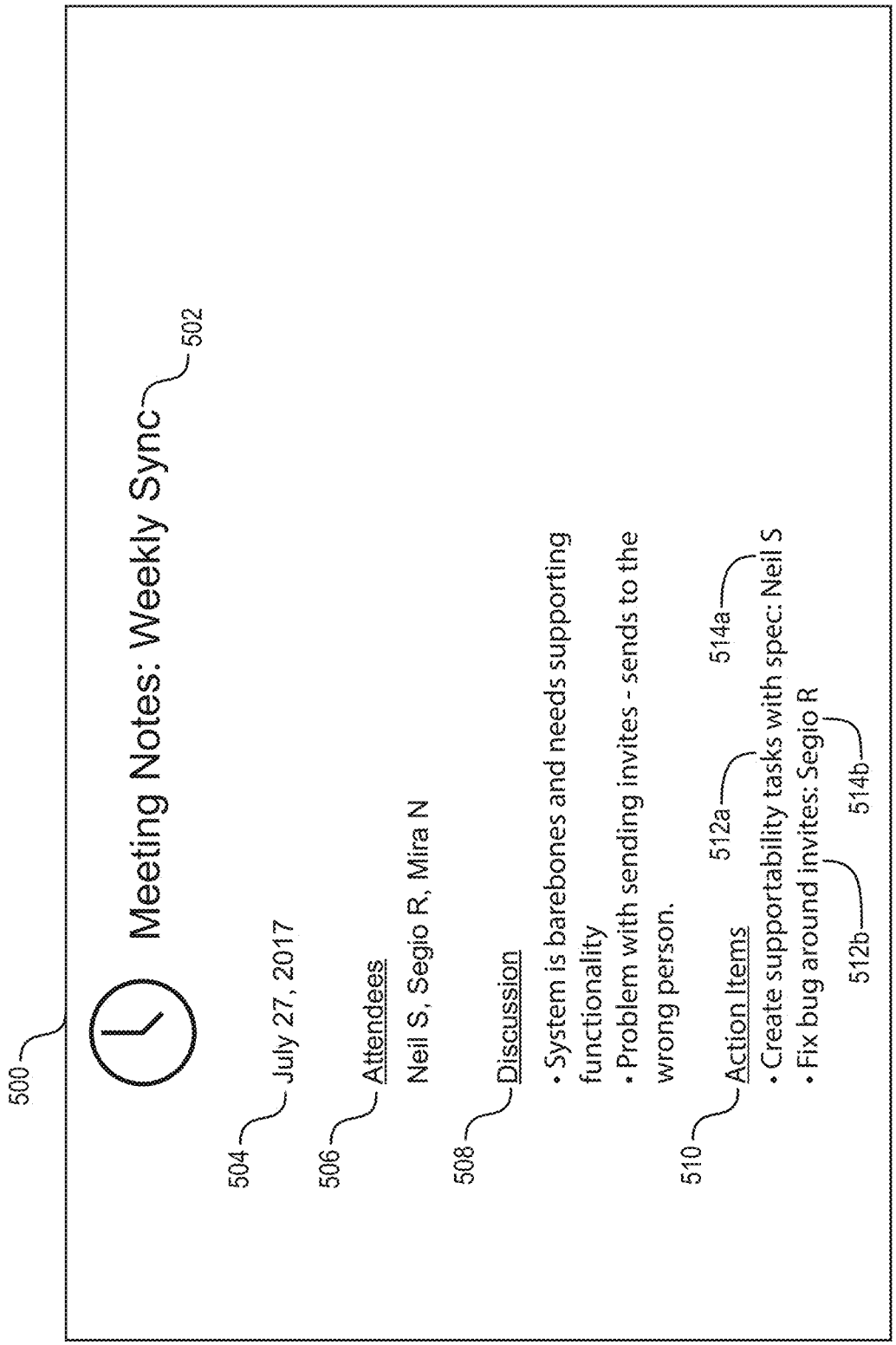
FIG. 5A illustrates an existing digital document in accordance with one or more embodiments.
Figure 5B:
FIG. 5B illustrates a new digital document incorporating content from a previous digital document in accordance with one or more embodiments.

For example, FIGS. 5A-5B illustrate generating a new digital document based on content from a digital document previously associated with a digital calendar event. In particular, FIG. 5A illustrates digital document 500 that can be associated with a recurring calendar event. In particular, digital document 500 represents a digital document associated with a previous iteration (e.g., the most recent iteration) of a recurring event. More specifically, metadata associated with digital document 500 can include event metadata to indicate an association with the previous iteration of the recurring event.

By way of example, digital document 500 can include notes taken during the occurrence of the meeting associated with the digital calendar event by a participant. In particular, digital document 500 can include title portion 502, date portion 504, participant portion 506, discussion portion 508, and action items portion 510. Each action item included within action items portion 510 provides a task that one or more participants of the event are assigned. In particular, each action item included in action items portion 510 includes an action portion (e.g., action portions 512a-512b) describing the task to be performed and an assignee portion (e.g., assignee portions 514a-514b) describing the participant assigned to perform the task. Typically, when a meeting associated with a recurring event occurs (especially in a business/employment environment), a participant assigned an action item reports on the progress of the action item during one or more of the meetings associated with the subsequent iterations of the event.

FIG. 5B illustrates digital document 520. In particular, digital document 520 represents a new digital document associated with an iteration of a recurring event subsequent to the iteration represented by digital document 500 of FIG. 5A. As can be seen in FIG. 5B, digital document 520 uses a format similar to that of digital document 500. In particular, digital document 520 includes title portion 522, date portion 524, participant portion 526, and discussion portion 528; however, because digital document 520 is a new digital document, some of these portions (e.g., participant portion 526 and discussion portion 528) have no content beyond the headings.

Additionally, digital document 520 includes action items report portion 530 and prior meeting summary portion 538. As mentioned above, if previous iterations of the event have associated digital documents, the event document management system can leverage the digital documents associated with the previous iterations of the event to generate (or modify) a digital document associated with the current iteration. For example, in one or more embodiments, the event document management system can incorporate content from the digital documents associated with the previous iterations (e.g., the action items, summary of the previous meeting, etc.) into a digital document associated with the current iteration. Thus, the event document management system provides participants of the current iteration of the recurring event the ability to review the substance of the prior meeting and get a report on any previously assigned action items without having to search for the digital documents associated with the previous iterations of the event.

In particular, action items report portion 530 includes content regarding any action item from a previous iteration of the recurring event. For example, in one or more embodiments, action items report portion 530 can include detail regarding any action item that has been previously assigned but not yet completed. Additionally, or alternatively, action items report portion 530 can include detail regarding action items that have been completed but not yet discussed or reported.

As shown in FIG. 5B, each action item included in action items report portion 530 includes a status portion (e.g., status portions 532a-532b), an action portion (e.g., action portions 534a-534b), and an assignee portion (e.g., assignee portions 536a-536b). In particular, the status portion provides an indication of the progress of the action item. For example, in one or more embodiments, the status portion provides a check box or some other form of binary indicator that indicates whether the action item has been completed or not. In one or more alternative embodiments, the status portion provides a more detailed indicator that indicates the assignee's overall progress in accomplishing the task (e.g., a percentage numeral showing the percentage of completion). In one or more embodiments, the action portion and assignee portion included in action items report portion 530 correspond directly to the action portion and assignee portion included in the digital document associated with the previous iteration of the event.

In particular, in one or more embodiments, the event document management system extracts, from the digital document associated from the previous iteration of the event, action item content associated with a participant of the recurring event. Subsequently, the event document management system determines whether there is an indication that the participant completed the action item. In particular, the event document management system tracks the progress of the action item to determine if and when the action item is completed. For example, in one or more embodiments, the event document management system can require that the participant input a completion status into a compute device to notify the event document management system that the action item has been completed. In some embodiments, the event document management system sends regular requests to the computing device of the participant, requesting an update on the progress of the action item. In one or more embodiments, the event document management system determines there is a lack of completion indication with regards to the action item (i.e., the assigned participant has not provided a progress update indicating completion). In response, the event document management system can provide the action item to the participant's computing device (e.g., as a reminder). If the time for a subsequent iteration of the recurring meeting has arrived, the event document management system can include the assigned action item (along with the incomplete status) within the digital document (e.g., digital document 520) associated with the subsequent iteration.

As mentioned above, digital document 520 can also include prior meeting summary portion 538. In particular, prior meeting summary portion 538 provides additional content from the meeting associated with the previous iteration of the recurring event. For example, in one or more embodiments, prior meeting summary portion 538 provides content from the digital document associated with the previous iteration of a calendar event not already covered by action items report portion 530. Alternatively, prior meeting summary portion 538 can include an automatically generated summary of the content.

Figure 5C:
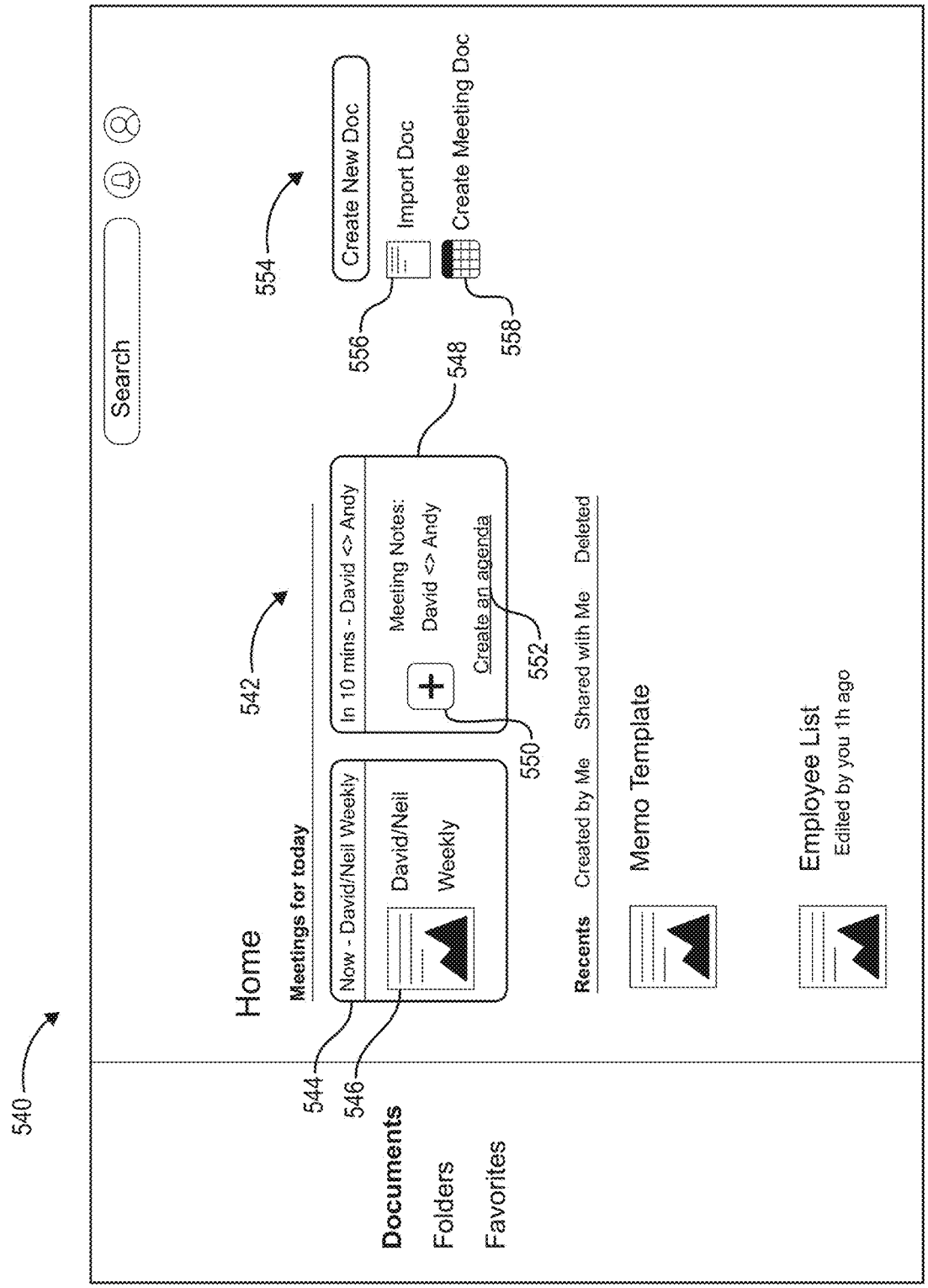
FIG. 5C illustrates a user interface comprising elements for suggesting, accessing, and/or generating digital documents in accordance with one or more embodiments.
Figure 5D:
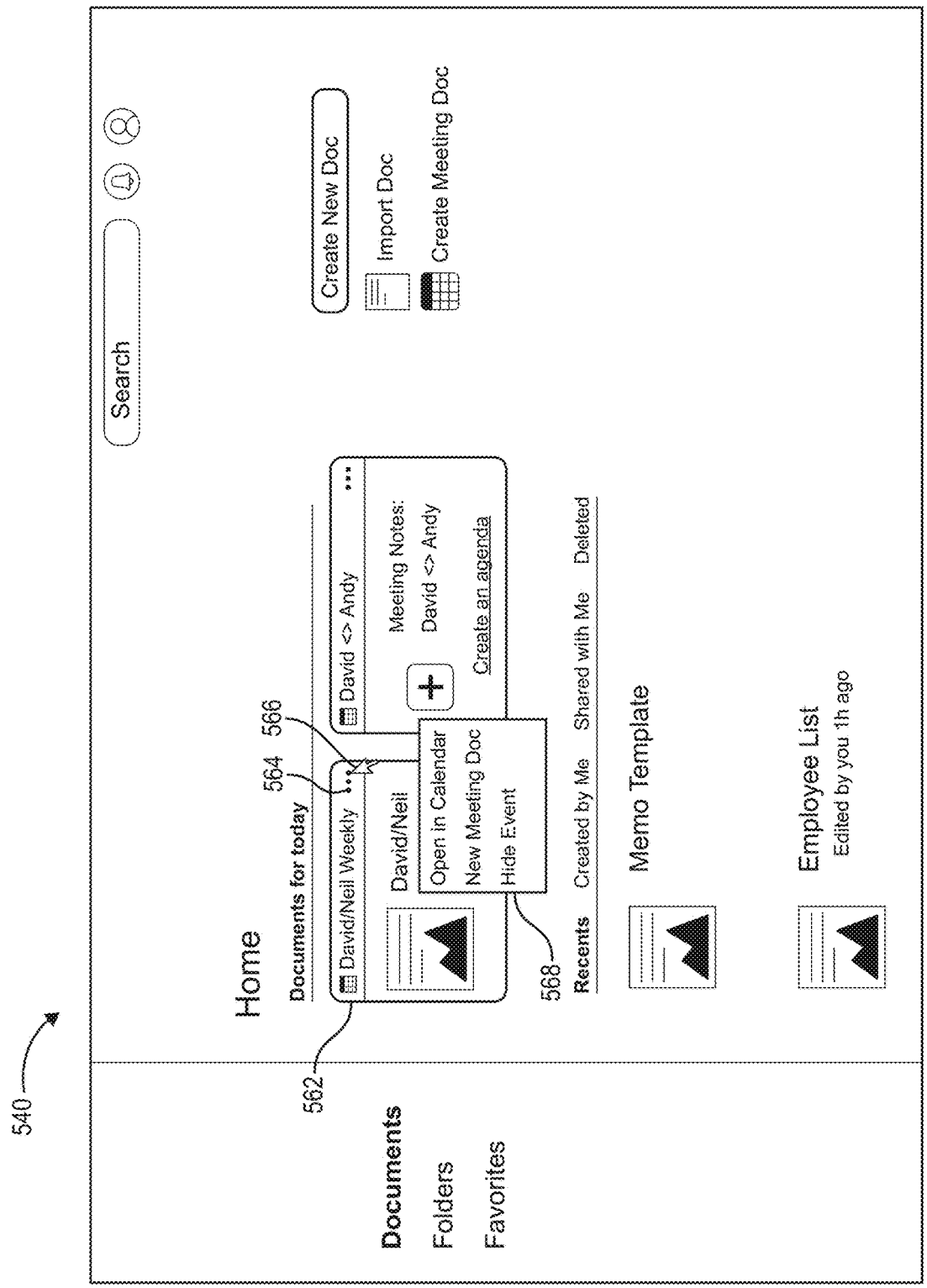
FIG. 5D also illustrates a user interface comprising elements for suggesting, accessing, and/or generating digital documents in accordance with one or more embodiments.

FIGS. 5C-5D illustrate additional user interfaces through which the event document management system can generate, access, and/or suggest digital documents in conjunction with a digital calendar event. In particular, FIGS. 5C-5D illustrate generating and/or suggesting digital documents before, during, and/or after the occurrence of a meeting associated with a digital calendar event.

For example, FIG. 5C illustrates user interface 540 in which the event document management system provides additional options to access existing digital documents, associate existing digital documents with digital calendar events, and/or create new digital documents for digital calendar events. In particular, user interface 540 includes a plurality of documents for a particular user (e.g., a homepage corresponding to the event document management system), and also includes digital calendar event retrieval viewport 542 and new document creation bar 554.

Digital calendar event retrieval viewport 542 provides a user with digital calendar events in which the user is participating or will participate. As seen in FIG. 5C, digital calendar event retrieval viewport 542 includes first digital calendar event indicator 544 and second digital calendar event indicator 548. In particular, first digital calendar event indicator 544 corresponds to a digital calendar event associated with a currently occurring meeting. However, one of ordinary school in the art will understand that first digital calendar event indicator 544 provides similar functionality for upcoming digital calendar events or digital calendar events associated with meetings that have already occurred.

As shown in FIG. 5C, first digital calendar event indicator 544 comprises (suggested) digital document 546. In one or more embodiments, digital document 546 is a link to a corresponding digital document. In some embodiments, digital document 546 is an attached copy of the digital document. In particular, digital document 546 is an existing digital document determined to have a content connection with the digital calendar event "David/Neil Weekly."

In one or more embodiments, the event document management system has already associated digital document 546 with the digital calendar event. In some embodiments, the event document management system provides digital document 546 as a suggested document based on a content connection with the digital calendar event. For example, even if digital document 546 is not currently associated with the digital calendar event, the event document management system provides digital document 546 so a participant of the digital calendar event can access digital document 546. In some embodiments, after the participant has accessed digital document 546, the event document management system provides further options to associate digital document 546 with the digital calendar event.

As seen in FIG. 5C, digital calendar event retrieval viewport 542 also includes second digital calendar event indicator 548. In particular, second digital calendar event indicator 548 provides the upcoming digital calendar event "David < > Anbu" (or a digital calendar event associated with an occurring or past meeting) and provides options to create new digital documents for that calendar event. For example, second digital calendar event indicator 548 includes document add button 550 and new document option 552. In particular, document add button 550 enables a participant of the digital calendar event to associate a digital document with the digital calendar event. In one or more embodiments, after the participant selects document add button 550, the event document management system provides the participant with a blank document, allowing the participant to create an entirely new digital document, which will then be associated with the digital calendar event. In some embodiments, the event document management system provides the participant with a list of existing digital documents that are available for association with the digital calendar event. For example, the event document management system can provide a list of all digital documents determined to have a content connection with the digital calendar event.

Additionally, second digital calendar event indicator 548 includes new document option 552. In particular, new document option 552 allows a participant of the digital calendar event to leverage the contents of existing digital documents in the creation of a new digital document. For example, if the digital calendar event "David < > Anbu" is a recurring calendar event in which past iterations of the event have been associated with digital documents (e.g., a digital document titled "Meeting Notes: David < > Anbu"), then selection of new document option 552 generates a new digital document associated with an upcoming iteration of the digital calendar event using the contents of the digital document associated with the past iterations of the event (similar to digital document 520 of FIG. 5B). In some embodiments, upon selection of new document option 552, the event document management system generates a new digital document using one or more templates (e.g., an agenda template). Accordingly, the event document management system can provide user interface 540 to allow a user to associate existing digital documents with a digital calendar event or generate digital documents for a digital calendar event from a homepage that comprises other documents managed by the event document management system.

As shown in FIG. 5C, user interface 540 also includes new document creation bar 554. New document creation bar 554 provides a user with additional options for managing digital documents associated with digital calendar events. For example, new document creation bar 554 includes import document option 556. Import document option 556 allows the user to select a pre-existing digital document for storage within the event document management system. For example, if selected, import document option 556 can allow the user to import digital documents associated with digital calendar events in which the user will participate (e.g., digital documents that have been associated with the calendar event by other participants of the event). In some embodiments, import document option 556 allows the user to import digital documents from other sources (e.g., databases, external electronic devices, etc.)

New document creation bar 554 also includes create meeting document option 558. Create meeting document option 558 allows a user to create a new association between a digital document and a digital calendar event. In one or more embodiments, selection of create meeting document option 558 provides the user with additional options to select an existing digital document and a digital calendar event in which the user will participate. Upon selection of the digital document and the calendar event, the event document management system can associate the digital document with the event. In one or more embodiments, selection of create meeting document option 558 provides the user with suggested documents (i.e., documents having a content connection with a digital calendar event and that can be associated with the event). In some embodiments, selection of create meeting document option 558 allows the user to create a new digital document and select a digital calendar event for the event document management system to associate with it.

FIG. 5D also illustrates user interface 540 providing a user with options corresponding to a digital calendar event. In particular, user interface 540 includes first digital calendar event indicator 562 for the digital calendar event "David/Neil Weekly." Specifically, first digital calendar event indicator 562 includes overflow option 564. When a participant of the digital calendar event selects overflow option 564 (e.g., using cursor 566), user interface 540 presents overflow menu 568. Through overflow menu 568, user interface 540 provides the participant with additional options with regard to the digital calendar event. For example, overflow menu 568 includes options to open the digital calendar event in the digital calendar application, create a new digital document for the digital calendar event, or to remove the digital calendar event from user interface 540 altogether. In one or more embodiments, if the participant selects to remove the digital calendar event, user interface 540 provides another digital calendar event along with another digital document within first digital calendar event indicator 562.

As mentioned above, in addition to generating (or modifying) a digital document for a digital calendar event, in one or more embodiments, the event document management system can also suggest and provide snippets of digital content for a digital document. As used herein, the term "snippet" refers to a segment of a digital document. In particular, snippet refers to a preselected segment of a digital document stored into memory by the event document management system for later use. For example, a snippet can include a preselected portion of content of a digital document (e.g., a section, multiple sections, one or more chapters, a quote, etc.) and/or a formatting of a digital document (e.g., heading, subheadings, spacing, indentation, etc.). Using snippets, the event document management system can suggest and incorporate portions of a previous digital document into a new digital document (e.g., regardless of the digital calendar event associated with either document).

Figure 6:
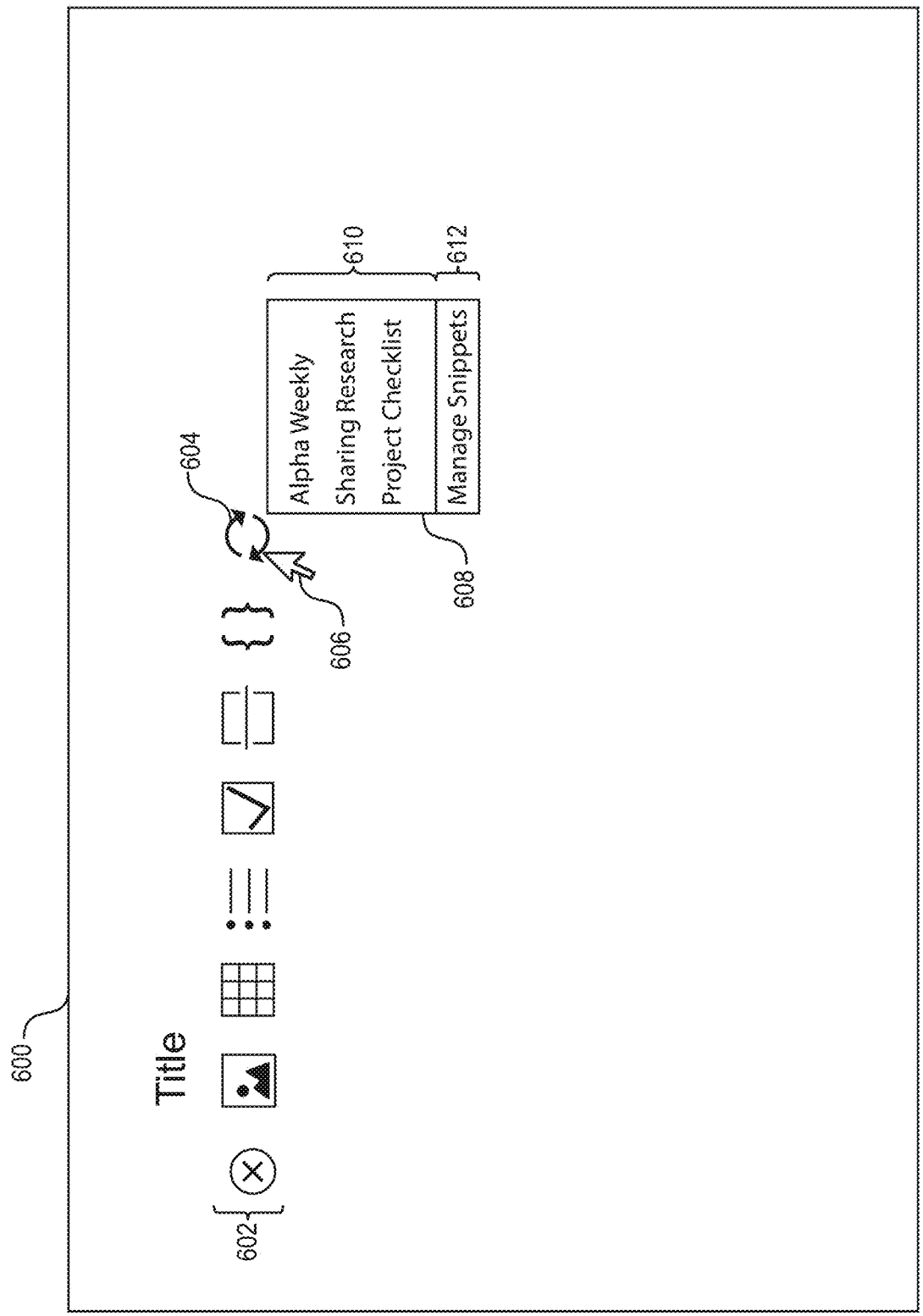
FIG. 6 illustrates a digital document interface providing options to insert a snippet in accordance with one or more embodiments.

For example, FIG. 6 illustrates digital document interface 600, which provides options to interact with existing snippets. In particular, digital document interface 600 illustrates an option in which the event document management system provides tools for manual interaction with existing snippets. For example, digital document interface 600 can include toolbar 602, which provides several tools in creating or controlling a digital document. In particular, toolbar 602 can include snippet manager option 604. Snippet manager option 604 provides the option to manually interact with pre-existing snippets. In one or more embodiments, selection of snippet manager option 604 using one or more selection options (e.g., cursor 606) reveals snippet manager menu 608.

In one or more embodiments, snippet manager menu 608 includes snippet inclusion portion 610 and manage snippets option 612. In particular, snippet inclusion portion 610 provides the name of preexisting snippets to add within the digital document. In one or more embodiments, selection of one of the preexisting snippets inserts the contents and/or the formatting associated with the snippet into the new digital document. In one or more alternative embodiments, selection of snippet inclusion portion 610 can reveal an additional window (not shown), providing a preview of the contents and/or formatting associated with the snippet and options to confirm or reject insertion of the contents and/or formatting into the digital document.

Further, through manage snippets option 612, the event document management system can manage the preexisting snippets in response to a user's direction. In particular, manage snippets option 612, if selected, further provides options to manually edit or delete preexisting snippets. For example, if manage snippets option 612 is selected, the event document management system can provide an additional window (not shown) providing a snippet selection field, a text editing field prepopulated with the contents and/or formatting associated with the selected snippet, tools for editing the snippet (e.g., font tools, formatting tools, etc.), and options to delete a snippet entirely, save edits made to a snippet, or to exit the window without making any changes. In one or more alternative embodiments, snippet manager menu 608 can include additional functionality. For example, if the event document management system has stored more snippets than it can display in one menu screen, snippet manager menu 608 can also include a search option, allowing a user to search for a snippet by features associated with the snippet (e.g., the name of the snippet, snippet content, metadata associated with the snippet, etc.).

Though FIG. 6 illustrates one or more embodiments in which the event document management system provides tools for a participant to manually insert snippets, in one or more embodiments the event document management system provides one or more suggested snippets to a user. In particular, the event document management system can determine one or more snippets from a plurality of stored snippets to suggest to a user. For example, the event document management system (either automatically or under the direction of a user) can extract, from a digital document, a snippet having a segment of the digital document. Subsequently, the event document management system can determine that there is a correspondence between the snippet and a new digital document associated with a new digital calendar event. Based on the determined correspondence, the event document management system can suggest, to a participant of the new digital calendar event (e.g., the creator of the new digital document), the snippet for insertion into the new document.

In one or more embodiments, the event document management system can determine which snippet to suggest to a user using a machine learning model trained to determine which snippets are relevant to the digital document with which the user is currently working. In particular, the event document management system can train a machine learning model in a way similar to the process for training the machine learning model 206 of FIG. 2; however, the event document management system trains the machine learning model for snippets using snippet characteristics, document characteristics, and/or digital event characteristics. For example, the event document management system can train a machine learning model to predict snippets to suggest based document content, snippet content, and/or calendar content. In this manner, the machine learning model can learn significant features for identifying appropriate snippets to suggest and utilize in digital documents.

For example, if a user begins to type in text (e.g., outline of budgets for various organizations for us in a finance meeting) that is the same or similar to text associated with a snippet (e.g., a previous outline of budgets for the various organizations used in a previous budget meeting), the event document management system can suggest that snippet to the user to allow quick insertion of the remaining text. Other examples of pertinent snippet characteristics can include snippets used by a user in the past, snippets used by others (e.g., most popular snippets), or snippets determined to incorporate best practices. In one or more embodiments, the snippets eligible for suggestion are limited only to those snippets stored with respect to an individual user, a project team, or a company. Alternatively, eligible snippets can include all snippets stored within the event document management system (e.g., training a machine learning model with snippets from a variety of different users, in accordance with appropriate privacy permissions).

In general, the event document management system can suggest a snippet to a user when the system determines that the user desires to include content and/or formatting within a digital document that has already been stored as a snippet. As mentioned above, the event document management system can recognize that a user has begun to insert content or formatting that corresponds to a stored snippet and may suggest that the user insert the snippet to avoid the time and effort of manual insertion. In the context of recurring events, the event document management system can suggest a snippet containing specific content and/or formatting that has been created and/or stored for the recurring event when a participant opens a new digital document for a current iteration of the event. Additionally, or alternatively, the event document management system can suggest a snippet when a participant creates a new type of digital document that corresponds to the snippet. For example, if a participant of an event generated a new digital document associated with an event and began to insert content indicating that the digital document would be used as an agenda, the event document management system can suggest a snippet containing content or formatting specific to agendas. In one or more additional embodiments, the event document management system can suggest snippets that a user has flagged as preferred snippets.

Figure 7:
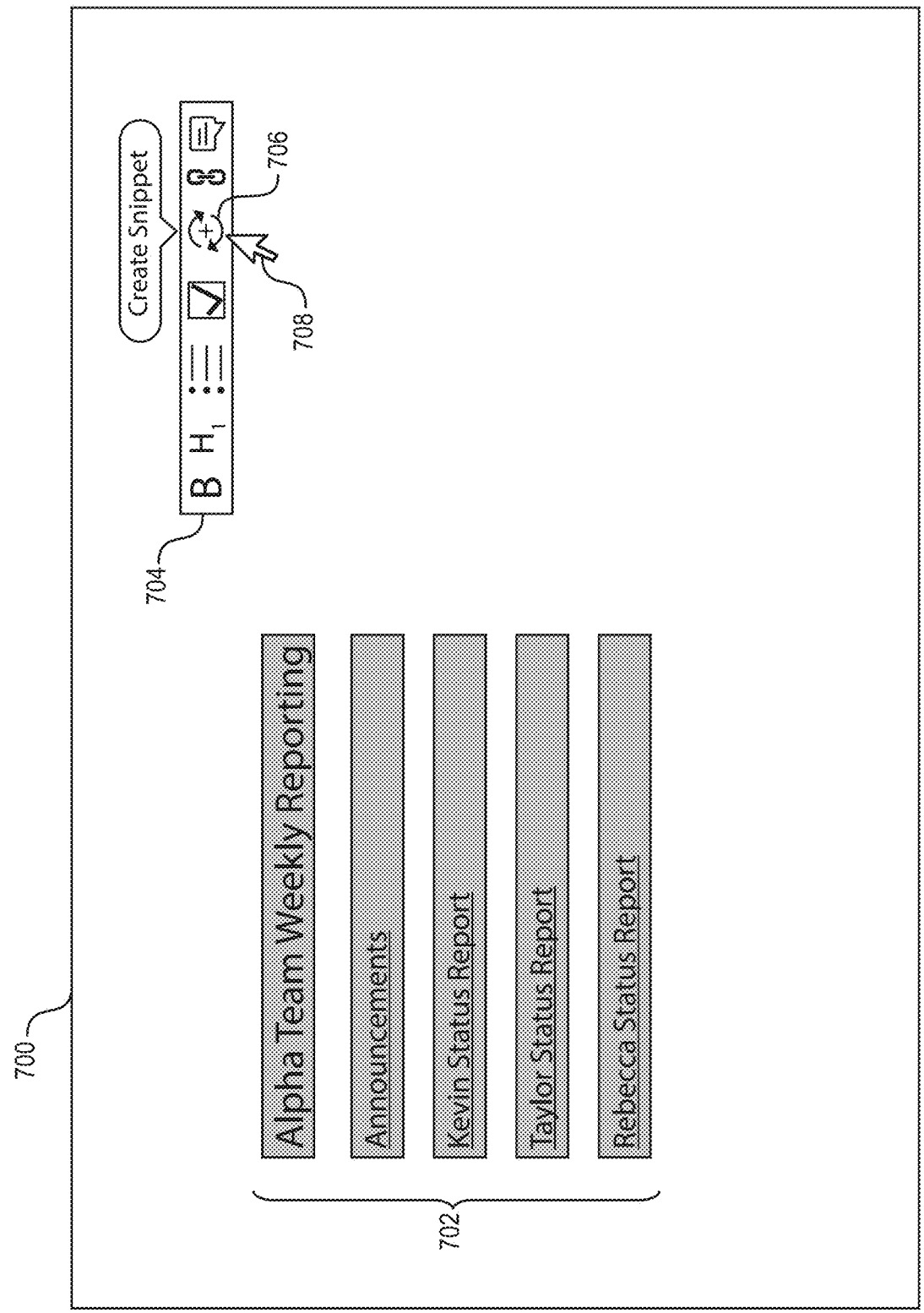
FIG. 7 illustrates a digital document interface providing options to create a snippet in accordance with one or more embodiments.

In addition to utilizing snippets, the event document management system can also generate snippets. For example, FIG. 7 illustrates digital document interface 700, which provides options for a user to manually create a snippet. In particular, digital document interface 700 illustrates how a user can use the event document management system to store content or formatting as a snippet for later use. For example, digital document interface 700 includes a previously inserted format. In particular, digital document interface 700 includes format 702 for a weekly team status report. In particular, format 702 provides various headings for the digital document's title, announcements, and the different team members' status reports. As shown in FIG. 7, a user has selected the various headings of format 702.

In one or more embodiments, after a user has selected the headings contained within format 702, the digital document interface 700 presents toolbar 704. In particular, toolbar 704 presents several options that a user may select to manipulate selected portions of a digital document (e.g., format 702). For example, toolbar 704 can include snippet creation option 706, which provides a user the ability to create a snippet from the selected portion of the digital document. In one or more embodiments, when a user selects snippet creation option 706 using cursor 708 or by any other method of selection, the event document management system creates and stores a snippet that can later be used. In one or more alternative embodiments, digital document interface 700 provides another window (not shown) in which the user can add context to the snippet before it is saved. For example, the user can add a title to the snippet, associate the snippet with a digital calendar event (e.g., a recurring event), classify the snippet as relevant to a particular type of digital document (e.g., agenda, to-do list, etc.), or add other details describing the purpose of the snippet.

In one or more alternative embodiments, the event document management system can automatically create a snippet (e.g., without user input). In particular, the event document management portion can automatically select portions of the digital document, add context (e.g., title, classification, etc.), and save the selected portions as a snippet. For example, in one or more embodiments, the event document management system determines a pattern of content and/or formatting that is used either with respect to an individual user, a digital calendar event (e.g., a recurring event) or a type of digital document (e.g., agenda) and stores the pattern of content and/or formatting as a snippet. Subsequently, when a user indicates that the pattern applies to a digital document, the event document management system can suggest the snippet to the user. For example, if the user creates a new digital document and began adding content indicating the digital document would be an agenda, the event document management system can suggest a snippet that was automatically created and includes content and/or formatting for agendas.

In addition to creating and providing snippets (e.g., during a meeting associated with a digital calendar event or during creation of a digital document associated with a digital calendar event) the event document management system can also provide beneficial tools that make use of a digital document associated with a digital calendar event after the occurrence of the meeting associated with the digital calendar event. In particular, the event document management system can use content included within a digital document associated with a calendar event to generate additional content to further benefit participants of the event.

For example, the event document management system can generate a summary of a digital document and provide the summary to the participants of the calendar event. By automatically providing a summary to the participants of the calendar event, the event document management system provides more flexibility in ensuring every participant of a digital calendar event receives relevant information.

Figure 8:
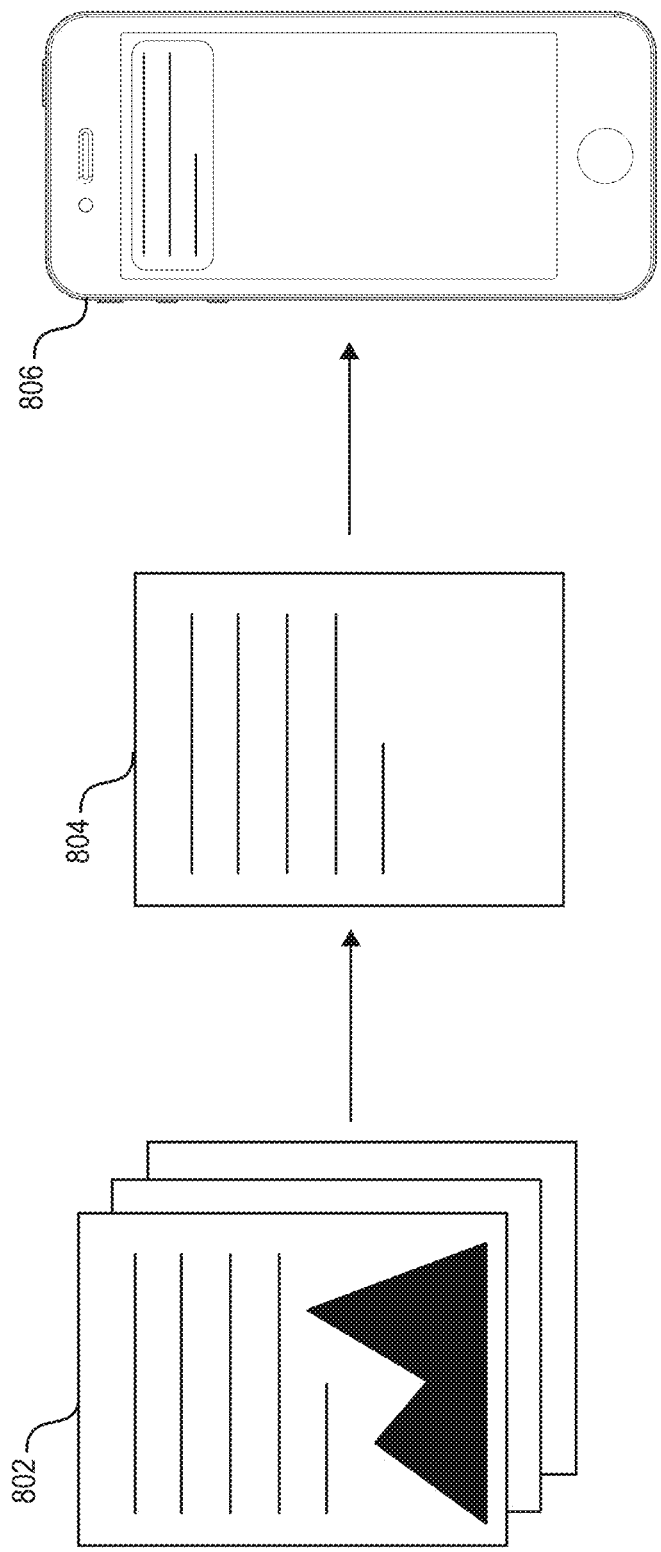
FIG. 8 illustrates a block diagram of generating a summary from digital documents in accordance with one or more embodiments.

FIG. 8 illustrates generating additional content (e.g., summaries) from digital documents associated with a digital calendar event. As shown, the event document management system can associate one or more event documents 802 with a digital calendar event. In one or more embodiments, event documents 802 contain text-based digital documents. Additionally, or alternatively, event documents 802 can include images, graphs, audio, or any other digital document providing information relevant to the digital calendar event.

As shown in FIG. 8, the event document management system generates summary document 804 based on event documents 802. In one or more embodiments, summary document 804 includes an aggregation of the contents of event documents 802. Alternatively, summary document 804 includes a generated summary of the contents included in event documents 802, the action items (or the most significant action items) included within event documents 802, or a transcription or summary of a transcription of an audio recording associated with the event.

In particular, to provide a summary of text-based content included in event documents 802, the event document management system can employ one or more of various methods. For example, in one or more embodiments, the event document management system extracts key sentences from each paragraph of text and then combines them to generate a summary. In particular, the event document management system splits the text into sentences and determines an intersection score between each possible pair of sentences. In particular, to determine the intersection score, the event document management system splits each sentence into words/tokens, counts how many words/tokens are common between the sentences, and normalizes the result with the average length of the two sentences. The event document management system then stores the intersection value for each pair of sentences in a matrix. Subsequently, the event document management system calculates a score for each sentence individually and stores it in a key-value dictionary where the sentence is the key and the value is the total score. To calculate the score for an individual sentence, the event document management system sums the values of all that sentence's intersections with the other sentences in the text. To build the summary itself, the event document management system selects the sentence with the highest individual score from each paragraph (e.g., the determined key sentence) and combines those sentences together. In one or more embodiments, the event document management system employs additional methods, such as TextRank, to provide a summary of text-based content.

As mentioned above, event documents 802 can include one or more audio components. In one or more embodiments, the event document management system transcribes the audio components and provides either the transcription or a summary of the transcription as part of summary document 804. In one or more embodiments, the event document management system utilizes a speech recognition algorithm to convert the audio component into text. Alternatively, the event document management system employs a third-party API to generate the transcription.

In one or more embodiments in which the event document management system provides a summary of the transcription, the system identifies and transcribes key audio phrases to include within summary document 804. For example, a participant of a digital calendar event may say a phrase, such as "take that task" or "sounds like a great idea." Consequently, the event document management system flags the phrase as a key phrase, transcribes the phrase along with surrounding discussion to obtain context, and provides the transcribed discussion portion or a summary thereof in summary document 804 as an action item assigned to a participant of the digital calendar event.

After generating a summary from event documents 802, the event document management system provides summary document 804 to each participant of the digital calendar event. Additionally, or alternatively, the event document management system associates document summary 804 with the calendar event so it is accessible through the digital calendar application.

As shown in FIG. 8, the event document management system further uses summary document 804 (or event documents 802) to generate notification 806 relevant to a participant of the digital calendar event. In particular, the event document management can provide notification 806 to a computing device (e.g., a mobile device) associated with the relevant participant. In one or more embodiments, notification 806 includes a message indicating that summary document 804 is available and a link to view the document. Additionally, or alternatively, notification 806 can include a reminder of pending action items included within summary document 804 (or event documents 802). In particular notification 806 can include those pending actions items that are relevant to the receiving participant.

In one or more embodiments, the event document management system can provide additional services with regards to summarizing one or more event documents (e.g., event documents 802). For example, event documents 802 can include several digital documents, each of which are associated with a different digital calendar event occurring through a predetermined time period (e.g., a day). Consequently, summary document 804 can include a summary of each digital document included within event documents 802. Further, the event document management system can provide an end-of-day summary to a user interface of a user computing device based on summary document 804. For example, the event document management system can provide a listing of all meetings associated with calendar events in which the user participated that day, a summary of the digital documents that have been associated with each calendar event, and a listing of action items that have been assigned during those meetings. In one or more embodiments, the event document management system provides only those action items relevant to the particular user. Alternatively, the event document management system can provide all action items assigned during a meeting to a participant of the associated digital calendar event having a special status with respect to that event (e.g., team leader, supervisor, event creator, etc.)

Figure 9:
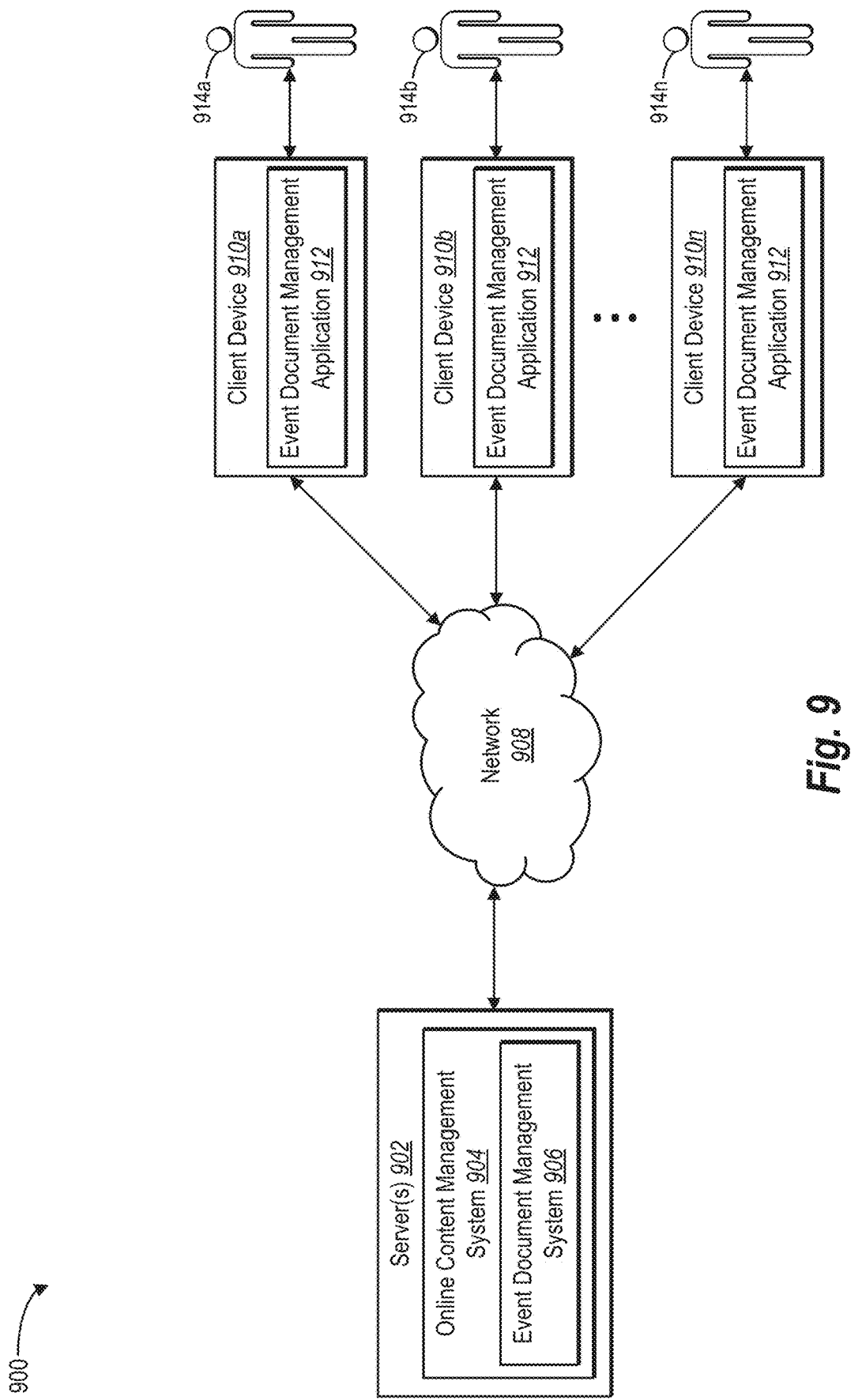
FIG. 9 illustrates an example diagram in which an event document management system can operate in accordance with one or more embodiments.

Turning now to FIG. 9, further information will be provided regarding implementation of the event document management system. Specifically, FIG. 9 illustrates a schematic diagram of one or more embodiments of exemplary system environment ("environment") 900 in which the event document management system can operate. As illustrated in FIG. 9, environment 900 can include server(s) 902, network 908, client devices 910a-910n, and users 914a-914n.

Although, FIG. 9 illustrates a particular number of client devices, it will be appreciated that environment 900 can include any number of computing devices (few or greater than shown). Similarly, although FIG. 9 illustrates a particular arrangement of server(s) 902, network 908, client devices 910a-910n, and users 914a-914n various additional arrangements are possible.

Server(s) 902, network 908, and client devices 910a-910n may be communicatively coupled with each other either directly or indirectly (e.g., through network 908, discussed in greater detail below in relation to FIG. 12). Moreover, server(s) 902 and client devices 910a-910n may include any type of computing device (including one or more computing devices as discussed in greater detail below in relation to FIG. 12).

As mentioned above, environment 900 includes server(s) 902. Server(s) 902 can generate, store, receive, and/or transmit any type of data, including calendar event characteristics 102 and document characteristics 108. For example, server(s) 902 may receive data from client device 910a and send the data to client device 910b. In one or more embodiments, server(s) 902 may comprise a data server. Server(s) 902 can also comprise a communication server or a web-hosting server.

As shown in FIG. 9, server(s) 902 can include online content management system 904. In particular, online content management system 904 provides functionality by which a user (e.g., any of users 914a-914n) can generate, manage, and/or store digital content. For example, user 914a can generate a new digital document using client device 910a. Subsequently, user 914a uses client device 910a to send the digital document to online content management system 904 hosted on server(s) 902 via network 908. Online content management system 904 then provides many options that user 914a may use to store the digital document, organize the digital document into a folder, and subsequently search for, access, and view the digital document. Additional detail regarding online content management system 904 is provided below (e.g., in relation to FIG. 13 and online content management system 1302).

In one or more embodiments, server(s) 902 include a calendar management system (not shown) to generate, store, and manage digital calendar events. In particular, the calendar management system generates, stores, and manages data associated with digital calendar events (e.g., calendar content data and historical meeting information). In some embodiments, server(s) 902 interact with one or more third-party calendar management systems. In such embodiments, server(s) 902 communicate with the third-party calendar management systems to obtain the data associated with the calendar events.

Additionally, server(s) 902 can include event document management system 906. In particular, in one or more embodiments, event document management system 906 uses server(s) 902 to associate a digital document with a digital calendar event. For example, event document management system 906 can use server(s) 902 to determine a digital document that is relevant to a digital calendar event and suggest the digital document to a user (e.g., a participant of the event)

For example, server(s) 902 can determine a digital document that is relevant to a digital calendar event. In particular, server(s) 902 can determine a digital document that is relevant based on calendar event characteristics and document characteristics as described with reference to FIG. 1. Server(s) 902 can then send, to a client device (e.g., client device 910a) associated with a participant of that event (e.g., user 914a), a suggestion that the digital document be associated with the digital calendar event. In particular, server(s) 902 can send the suggestion to client device 910a via network 908. Server(s) 902 can then receive a response from client device 910a either accepting or rejecting the suggestion. If server(s) 902 receives a rejection from client device 910a, then server(s) 902 may either provide a new suggestion or simply stop providing suggestions. But if server(s) 902 receives an acceptance of the suggested documents, server(s) 902 can associated the digital document with the digital calendar event. In one or more embodiments, server(s) 902 attach a copy of the digital document to the digital calendar event made accessible through the digital calendar event application or through a user interface providing reminders of upcoming digital calendar events. Alternatively, server(s) 902 provides a link to the digital document with the calendar event. In one or more embodiments, server(s) 902 additionally adds event metadata to the metadata of the digital document, indicating an association with the calendar event.

As illustrated by the previous example embodiments, the event document management system 906 may be implemented in whole, or in part, by the individual elements of environment 900. Although FIG. 9 illustrates the event document management system 906 implemented with regard to server(s) 902, it will be appreciated that components of event document management system 906 can be implemented in any of the components of environment 900. The components of event document management system 906 will be discussed in more detail with regard to FIG. 10 below.

In one or more embodiments, client devices 910a-910n include computer devices that allow users of the devices (e.g., users 914a-914n) to access and interact with digital documents, such as those digital documents associated with digital calendar events. For example, client devices 910a-910n can include smartphones, tablets, desktop computers, laptop computers, or other electronic devices. Client devices 910a-910n can include one or more applications (e.g., event document management application 912) that allows users 914a-914n to access and interact with digital documents associated with calendar events. For example, event document management application 912 can include a software application installed on client devices 910a-910n. Additionally, or alternatively, event document management application 912 can include a software application hosted on server(s) 902, which may be accessed by client devices 910a-910n through another application, such as a web browser.

Figure 10:
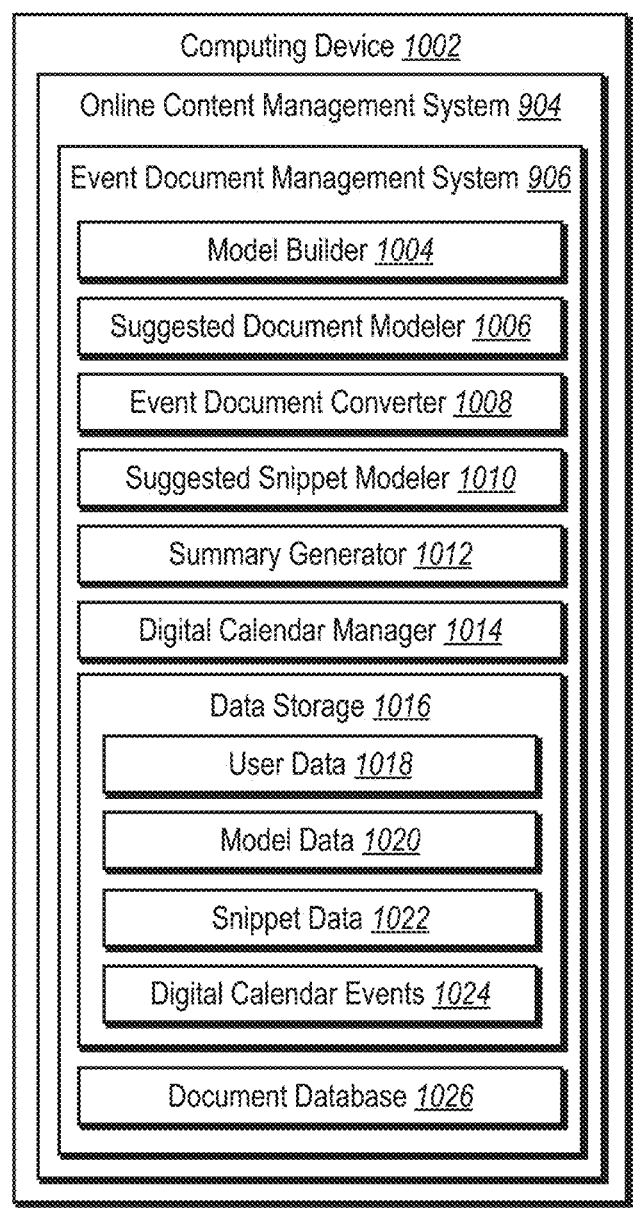
FIG. 10 illustrates an example schematic diagram of an event document management system in accordance with one or more embodiments.

Turning now to FIG. 10, additional detail will be provided regarding various components and capabilities of the event document management system 906. In particular, FIG. 10 illustrates event document management system 906 implemented by computing device 1002 (e.g., server(s) 902 and/or client devices 910a-910n as discussed above with reference to FIG. 9). Additionally, event document management system 906 is also part of online content management system 904. As shown, event document management system 906 can include, but is not limited to, model builder 1004, suggested document modeler 1006, event document converter 1008, suggested snippet modeler 1010, summary generator 1012, digital calendar manager 1014, data storage 1016 (which includes user data 1018, model data 1020, snippet data 1022, and digital calendar event 1024), and document database 1026.

As just mentioned, and as illustrated in FIG. 10, event document management system 906 includes model builder

1004. In particular, model builder 1004 builds the model used to determine a content connection between a digital document and a digital calendar event and select the digital document to suggest to a participant of the calendar event. For example, model builder 1004 trains machine learning model 206 using historical calendar event characteristics 202 and historical document characteristics 204 as discussed with reference to FIG. 2. In one or more embodiments, model builder 1004 similarly trains a machine learning model used to suggest a snippet to a user.

As shown in FIG. 10, event document management system 906 also includes suggested document modeler 1006. In particular, suggested document modeler 1006 uses the model built by model builder 1004. For example, in one or more embodiments, suggested document modeler 1006 uses a machine learning model trained by model builder 1004. For example, suggested document modeler 1006 applies calendar event characteristics associated with an upcoming digital calendar event and document characteristics associated with a plurality of digital documents to a trained machine learning model to determine which of the digital documents has a content connection with the calendar event. Based on that determination, suggested document modeler 1006 can select one or more digital documents to suggest to a user as digital documents that can be associated with the calendar event.

Additionally, as shown in FIG. 10, event document management system 906 includes event document converter 1008. In particular, event document converter 1008 generates a digital association between a digital document and a digital calendar event. For example, in one or more embodiments, event document converter 1008 attaches a copy of the digital document to the digital calendar event. Moreover, the event document converter 1008 can attach a link to the digital calendar event, providing access to the digital document. Similarly, event document converter 1008 can add event metadata to the metadata of the digital document indicating an association with the digital calendar event.

Further, event document converter 1008 provides functionality combined with associating a digital document with a recurring calendar event. For example, event document converter 1008 can determine that a digital calendar event is an iteration of a recurring event and determine which digital documents are associated with past iterations of the recurring event. Subsequently, event document converter 1008 can extract content (e.g., text or action items) from the digital documents associated with the past iterations and import the content into a (new) digital document associated with a subsequent iteration of the recurring event.

As shown in FIG. 10, event document management system 906 also includes suggested snippet modeler 1010. In particular, suggested snippet modeler 1010 uses the model built by model builder 1004. For example, in one or more embodiments, suggested snippet modeler 1010 uses a machine learning model trained by model builder 1004 to determine one or more snippets to suggest to a user as snippets that can be included in a digital document.

Additionally, as shown in FIG. 10, event document management system 906 includes summary generator 1012. In particular, summary generator 1012 can generate a summary document as discussed above with reference to FIG. 8. In particular, summary generator 1012 can analyze one or more event documents to generate a summary document. Subsequently, summary generator 1012 can associate the summary document with the appropriate digital calendar event or send the summary document to the participants of the event. Additionally, or alternatively, where the event documents include one or more audio components, summary generator can transcribe the audio components into text and associate either the transcription or a summary of the transcription with the digital calendar event (or send directly to the participants of the event). Further, summary generator 1012 can send notifications to computing devices associated with the participants of the events that either notify the participants of the summary document or provide reminders to complete assigned action items. Further, summary generator 1012 can provide an end-of-day summary to a user, including information with regards to the meetings the user participated in that day and the action items assigned to the user during those meetings.

As shown in FIG. 10, event document management system 906 also includes digital calendar manager 1014. In particular, digital calendar manager 1014 interacts with one or more digital calendar applications to access a user's digital calendar. For example, digital calendar manager 1014 can determine whether a user will be participating in any upcoming calendar events. Additionally, or alternatively, digital calendar manager 1014 can extract, from the digital calendar applications, calendar event characteristics, which can be used by model builder 1004 to train a model and suggested document modeler 1006 to use the trained model to determine a content connection between a digital document and a particular calendar event. Additionally, when event document converter 1006 associates a digital document with a calendar event, digital calendar manager 1014 provides the copy of the digital document or a link to the copy to the digital calendar application to make the digital document or link accessible through the application's user interface.

Further, as shown in FIG. 10, event document management system 906 includes data storage 1016. In particular, data storage 1016 includes user data 1018, model data 1020, snippet data 1022, and digital calendar events 1024. User data 1018 includes all data regarding a specific user of event document management system 906. In particular, user data 1018 includes user profile information, past user actions (e.g., snippets created by or used by a user), and information regarding digital calendar events the user will be participating in. Additionally, model data 1020 stores the models built by model builder 1004. For example, model data 1020 can store a machine learning model trained by model builder 1004 to determine a content connection between a digital document and a digital calendar event and select a digital document to suggest to a user. In particular, model data 1020 can store the weights determined for each feature (e.g., calendar event characteristics and document characteristics) in training the machine learning model. Further, data storage 1016 includes snippet data 1022. In particular, snippet data 1022 stores snippets and any related data. For example, snippet data 1022 can store a snippet, the date and/or time the snippet was created or last edited, whether the snippet is associated with a best practice, or whether the snippet is preferred by a particular user. Additionally, data storage 1016 includes digital calendar events 1024. In particular, digital calendar events 1024 stores data related to digital calendar events (e.g., calendar content and historical meeting information).

As shown in FIG. 10, event document management system also includes document database 1026. In particular, document database 1026 stores existing digital documents that can be associated with digital calendar events.

The components 1004-1026 and their corresponding elements can comprise software, hardware, or both. For example, the components 1004-1026 and their corresponding elements can comprise one or more instructions stored on a computer-readable storage medium and executable by processors of one or more computing devices. The components 1004-1026 and their corresponding elements can comprise hardware, such as a special purpose processing device to perform a certain function or group of functions. Additionally, or alternatively, the components 1004-1026 and their corresponding elements can comprise a combination of computer-executable instructions and hardware.

Furthermore, the components 1004-1026 of the event document management system 906 may, for example, be implemented as one or more stand-alone applications, as one or more modules of an application, as one or more plug-ins, as one or more library functions or functions that may be called by other applications, and/or as a cloud-computing model. Thus, the components 1004-1026 of the event document management system 906 may be implemented as a stand-alone application, such as a desktop or mobile application. Furthermore, the components 1004-1026 of the event document management system 906 may be implemented as one or more web-based applications hosted on a remote server. Alternatively, or additionally, the components of the event document management system 906 may be implemented in a suite of mobile device applications or "apps."

Figure 11:
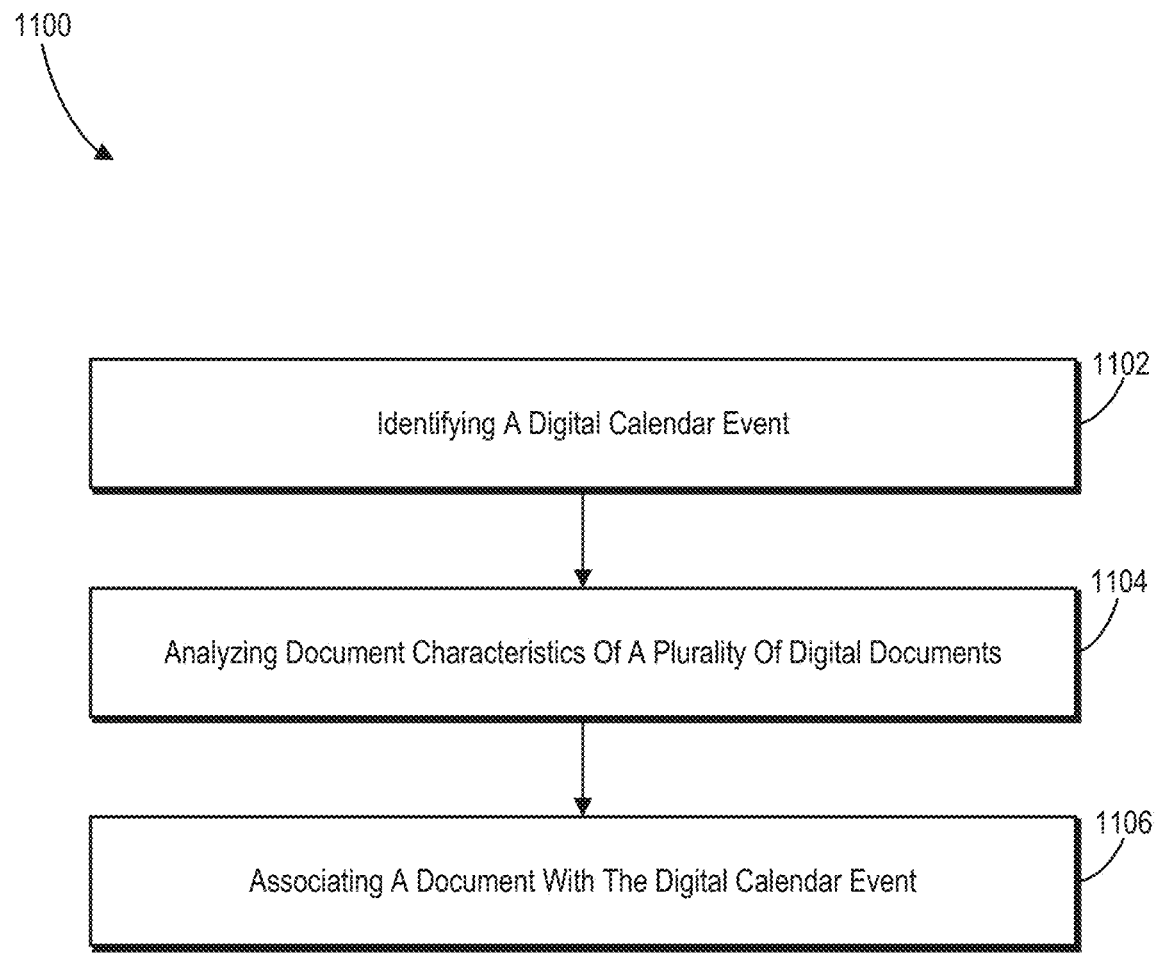
FIG. 11 illustrates a flowchart of a series of acts of associating a digital document with a digital calendar event.

Turning now to FIG. 11, this figure illustrates a series of acts 1100 to associate a digital document with a digital calendar event based on a content connection between the digital document and the event. While FIG. 11 illustrates acts according to one embodiment, alternative embodiments may omit, add to, reorder, and/or modify any of the acts shown in FIG. 11. The acts of FIG. 11 can be performed as part of a method. In one or more embodiments, a non-transitory computer readable medium can comprise instructions that, when executed by one or more processors, cause a computing device to perform the acts of FIG. 11. In still further embodiments, a system can perform the acts of FIG. 11.

The series of acts 1100 includes an act 1102 of identifying a digital calendar event. For example, act 1102 involves identifying a digital calendar event comprising a plurality of participants, wherein the digital calendar event is accessible to a plurality of computing devices of the plurality of participants. One or more embodiments involve identifying a digital calendar event from one or more digital calendar applications. For example, a user can use multiple digital calendar applications for different purposes. Consequently, the event document management system can access the multiple calendar applications to identify the digital calendar event.

The series of acts 1100 also includes an act 1104 of analyzing document characteristics of a plurality of digital documents. For example, act 1104 involves analyzing document characteristics of a plurality of digital documents to determine a content connection between a document of the plurality of digital documents and the digital calendar event where the content connection is based on document content of the document and calendar content of the digital calendar event. In one or more embodiments, analyzing the document characteristics includes analyzing document characteristics of the document and calendar event characteristics of the digital calendar event via a machine learning model trained, using historical document characteristics and historical calendar event characteristics, to determine the content connection and selecting the document based on the determined content connection.

In one or more embodiments, the content connection includes at least one of a document title or document text, and the calendar content includes at least one of a digital calendar event title or a digital calendar event description. In particular, the act 1104 determines the content connection by comparing the document content and the calendar content. In one or more embodiments, the event document management system provides for display, via a client device of a participant of the plurality of participants, a suggestion comprising the document based on the determined content connection.

In one or more embodiments, the event document management system further determines access characteristics of the document based on one or more of historical sharing information between the plurality of participants, participant access credentials of one or more participants of the plurality of participants, or historical access information of the document by the one or more participants of the plurality of participants. Additionally, or alternatively, the event document management system determines historical meeting information associated with the digital calendar event. Consequently, the content connection between the document and the digital calendar event is further based on the access characteristic of the document and/or the historical meeting information associated with the digital calendar event.

The series of acts 1100 further includes act 1106 of associating a document with the digital calendar event. For example, act 1106 involves, based on the determine content connection, associating the document with the digital calendar event such that the document is accessible to the plurality of computing devices of the plurality of participants. In one or more embodiments, associating the document with the digital calendar event includes adding event metadata to the document indicating an association with the digital calendar event. Additionally, in one or more embodiments, associating the document with the digital calendar event includes: extracting, from the document, action item content associated with a participant of the plurality of participants; determining a lack of completion indication corresponding to an action item associated with the action item content; and providing the action item to a computing device of the assigned participant based on the determined lack of completion. Further, in one or more embodiments, after the event document management system determines the content connection between the digital document and the digital calendar event (i.e., performs act 1104), the event document management system associates the document with the digital calendar event by providing a link corresponding to the document with the digital calendar event.

In one or more embodiments, the series of acts 1100 further includes receiving a search request and providing a digital document associated with the digital calendar event in response (not shown). For example, these acts involve receiving, from a computing device of a plurality of computing devices, a search request within a threshold time of a digital calendar event. In particular, the event document management system may receive a search string from a participant of a digital calendar event or another indication that the participant intends to search for a digital document (e.g., clicks in a search bar of a user interface). In response to receiving the search request within the threshold time of the digital calendar event, the event document management system can provide, for display, to the computing device, a suggestion comprising the document associated with the digital calendar event based on the content connection between the document and the digital calendar event.

In one or more embodiments, the event document management system can also provide the document to a computing device of the plurality of computing devices (e.g., a computing device associated with a participant). For example, if there is a document associated with a current meeting associated with a digital calendar event, the event document management system can suggest that the user open the particular document during the meeting. Further, the event document management system can receive, from the computing device, a modification to the document during the meeting associated with the digital calendar event. For example, if the participant desires to edit the document during the meeting, the system can modify the document in accordance with the participant's actions. Additionally, the event document management system can generate a summary of the modified document after the meeting. For example, because the modified document contains new information, the event document management system can generate a summary document containing the new information.

In one or more embodiments, the event document management system can use the document to create and provide snippets. For example, in one or more embodiments, the event document management system can extract, from the document, a snippet that includes a segment of the document. Subsequently, the event document management system can determine a correspondence between the snippet and a new document of a new digital calendar event. For example, a participant of a new digital calendar event may create the new document and begin inserting text within the new document that matches the document segment included within the snippet. Based on the determined correspondence between the snippet and the new document of the new digital calendar event, the event document management system can then suggest the snippet for insertion in the new document.

Additionally, in one or more embodiments, the event document management system can determine whether or not a digital calendar event is part of a recurring event. In particular, the event document management system can determine whether the digital calendar event is a first iteration of a recurring event. Based on determining that the digital calendar event is a first iteration of a recurring event, the event document management system can extract one or more of text or an action item. Subsequently, the event document management system can generate a new document for a second iteration of the recurring event by importing the one or more of text of the action item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
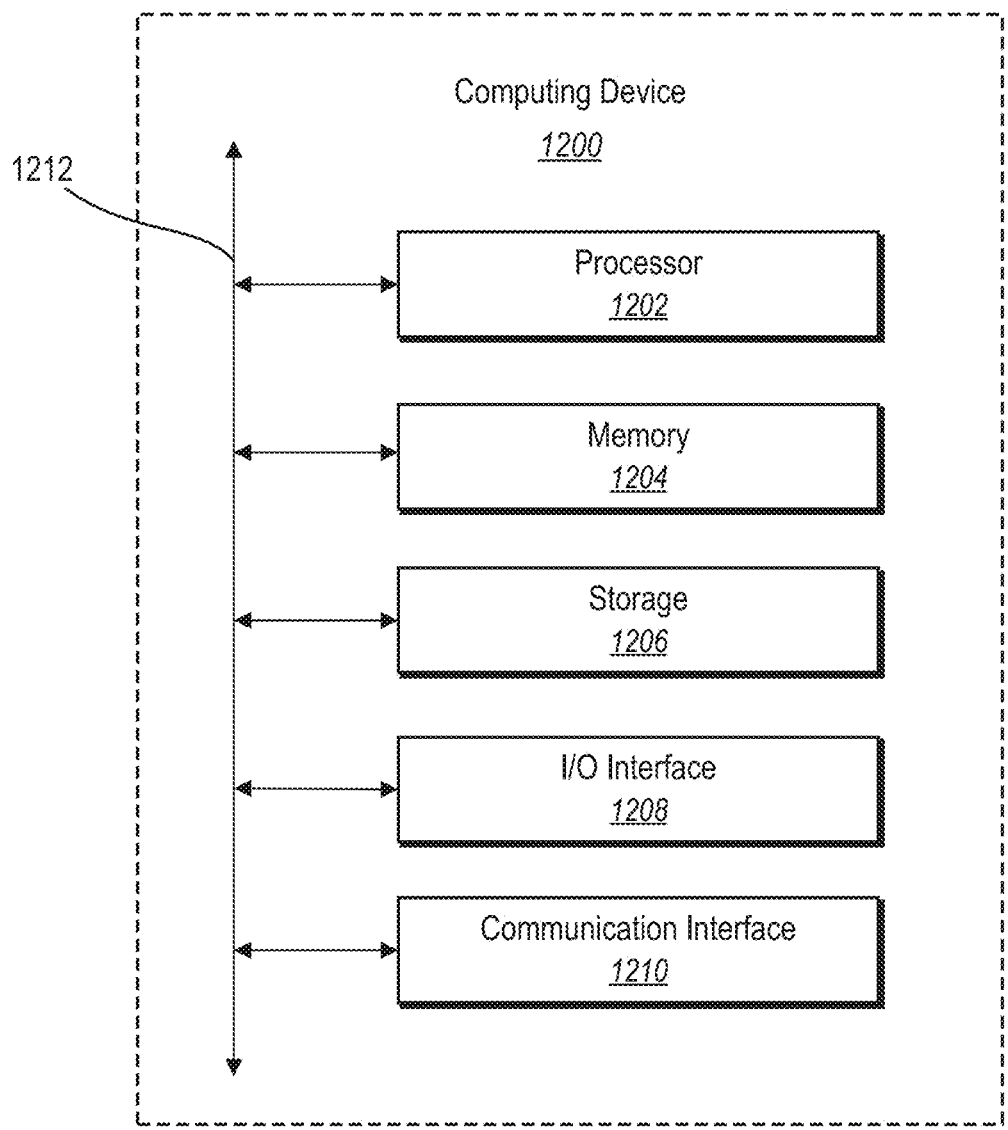
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that server(s) 902 and/or client devices 910a-910n may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (MC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
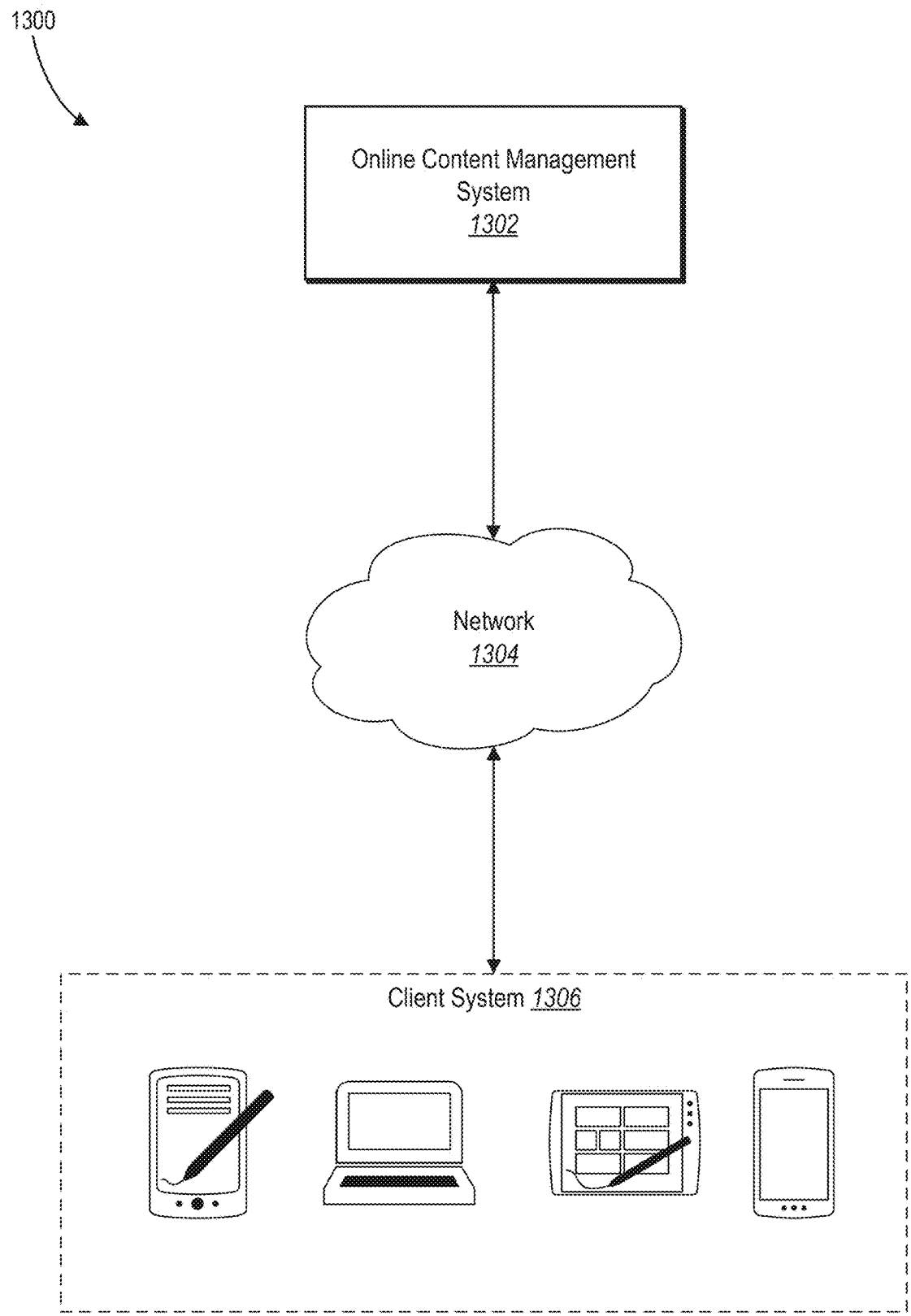
FIG. 13 illustrates an example environment of a networking system having the event document management system in accordance with one or more embodiments

FIG. 13 is a schematic diagram illustrating environment 1300 within which one or more embodiments of online content management system 904 can be implemented. Online content management system 1302 may generate, store, manage, receive, and send digital content (such as digital videos). For example, online content management system 1302 may send and receive digital content to and from client devices 1306 by way of network 1304. In particular, online content management system 1302 can store and manage a collection of digital content. Online content management system 1302 can manage the sharing of digital content between computing devices associated with a plurality of users. For instance, online content management system 1302 can facilitate a user sharing a digital content with another user of online content management system 1302.

In particular, online content management system 1302 can manage synchronizing digital content across multiple client devices 1306 associated with one or more users. For example, a user may edit digital content using client device 1306. The collaborative content management system 1302 can cause client device 1306 to send the edited digital content to online content management system 1302. Online content management system 1302 then synchronizes the edited digital content on one or more additional computing devices.

In addition to synchronizing digital content across multiple devices, one or more embodiments of online content management system 1302 can provide an efficient storage option for users that have large collections of digital content. For example, online content management system 1302 can store a collection of digital content on online content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from online content management system 1302. In particular, upon a user selecting a reduced-sized version of digital content, client device 1306 sends a request to online content management system 1302 requesting the digital content associated with the reduced-sized version of the digital content. Online content management system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., DROPBOX PAPER for IPHONE or IPAD, DROPBOX PAPER for ANDROID, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access collaborative content management system 1302.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method, comprising:
identifying a pre-existing digital calendar event comprising a plurality of participants, wherein the pre-existing digital calendar event is accessible to a plurality of computing devices of the plurality of participants;
determining a content connection between a document of a plurality of digital documents stored via a document management system and the pre-existing digital calendar event by processing document content of the document and calendar content of the pre-existing digital calendar event utilizing a machine learning model trained to determine content connections between digital documents and digital calendar events via iterative parameter updates based on historical calendar event characteristics, historical document characteristics, and feedback from comparing predicted documents and corresponding ground truths via a loss function;
based on the determined content connection, recommending the document for the pre-existing digital calendar event by providing, for display within a graphical user interface on a computing device from the plurality of computing devices of the plurality of participants, a recommendation comprising a selectable option to associate the document with the pre-existing digital calendar event; and
in response to receiving a user selection of the selectable option via the computing device, associating the document with the pre-existing digital calendar event such that the document is accessible to other computing devices from the plurality of computing devices of the plurality of participants.

2. The method of claim 1, wherein processing the document content of the document and the calendar content of the pre-existing digital calendar event utilizing the machine learning model comprises processing the document content and the calendar content utilizing a neural network.

3. The method of claim 1, wherein the document content comprises at least one of a document title or document text, and wherein the calendar content comprises at least one of a digital calendar event title or a digital calendar event description, and further comprising:
determining the content connection by comparing the document content and the calendar content.

4. The method of claim 1, further comprising:
providing the document to an additional computing device of the plurality of computing devices;
receiving, from the additional computing device, a modification to the document during a meeting associated with the pre-existing digital calendar event; and
generating a summary of the modified document after the meeting.

5. The method of claim 1, wherein associating the document comprises:
extracting, from the document, action item content associated with a participant of the plurality of participants;
determining a lack of completion indication corresponding to an action item associated with the action item content; and
providing the action item to a computing device of the participant based on the determined lack of completion indication.

6. The method of claim 1, wherein associating the document with the pre-existing digital calendar event comprises adding event metadata to the document indicating an association with the pre-existing digital calendar event.

7. The method of claim 1, further comprising:
determining an access characteristic of the document based on one or more of:
historical sharing information between the plurality of participants;
historical access information of the document by one or more participants of the plurality of participants; or
participant access credentials of one or more participants of the plurality of participants; and
determining the content connection between the document and the pre-existing digital calendar event by processing the access characteristic of the document utilizing the machine learning model.

8. The method of claim 1, further comprising:
determining historical meeting information associated with the pre-existing digital calendar event; and
determining the content connection between the document and the pre-existing digital calendar event by processing the historical meeting information associated with the pre-existing digital calendar event utilizing the machine learning model.

9. The method of claim 1, wherein associating the document with the pre-existing digital calendar event such that the document is accessible to the other computing devices from the plurality of computing devices of the plurality of participants comprises modifying access credentials of at least one participant associated with the other computing devices to enable the at least one participant to access the document.

10. The method of claim 1, further comprising:
extracting, from the document, a snippet comprising a segment of the document;
determining a correspondence between the snippet and a new document of a new digital calendar event; and
based on determining the correspondence between the snippet and the new document of the new digital calendar event, suggesting the snippet for insertion in the new document.

11. The method of claim 1, further comprising: in response to determining that the pre-existing digital calendar event is a first iteration of a recurring event:
extracting, from the document, one or more of text or an action item; and
generating a new document for a second iteration of the recurring event by importing the one or more of the text or the action item.

12. A non-transitory computer readable storage medium comprising instructions that, when executed by at least one processor, cause a computer device to:
identify a pre-existing digital calendar event comprising a plurality of participants, wherein the pre-existing digital calendar event is accessible to a plurality of computing devices of the plurality of participants;
determine a content connection between a document of a plurality of digital documents stored via a document management system and the pre-existing digital calendar event by processing document content of the document and calendar content of the pre-existing digital calendar event utilizing a machine learning model trained to determine content connections between digital documents and digital calendar events via iterative parameter updates based on historical calendar event characteristics, historical document characteristics, and feedback from comparing predicted documents and corresponding ground truths via a loss function;

based on the determined content connection, recommend the document for the pre-existing digital calendar event by providing, for display within a graphical user interface on a computing device from the plurality of computing devices of the plurality of participants, a recommendation comprising a selectable option to associate the document with the pre-existing digital calendar event; and in response to receiving a user selection of the selectable option via the computing device, associate the document with the pre-existing digital calendar event such that the document is accessible to other computing devices from the plurality of computing devices of the plurality of participants.

13. The non-transitory computer readable storage medium of claim 12, wherein the instructions, when executed by the at least one processor, cause the computing device to process the document content of the document and the calendar content of the pre-existing digital calendar event utilizing the machine learning model by processing the document content and the calendar content utilizing a neural network.

14. The non-transitory computer readable storage medium of claim 12, further comprising instructions that, when executed by the at least one processor, cause the computing device to:
provide the document to an additional computing device of the plurality of computing devices;
receive, from the additional computing device, a modification to the document during a meeting associated with the pre-existing digital calendar event; and
generate a summary of the modified document after the meeting.

15. The non-transitory computer readable storage medium of claim 12, further comprising instructions that, when executed by the at least one processor, cause the computing device to:
determine an access characteristic of the document based on one or more of:
  historical sharing information between the plurality of participants;
  participant access credentials of one or more participants of the plurality of participants; or
  historical access information of the document by the one or more participants of the plurality of participants; and
determine the content connection between the document and the pre-existing digital calendar event by processing the access characteristic of the document utilizing the machine learning model.

16. The non-transitory computer readable storage medium of claim 12, further comprising instructions that, when executed by the at least one processor, cause the computing device to:
determine historical meeting information associated with the pre-existing digital calendar event; and
determine the content connection between the document and the pre-existing digital calendar event by processing the historical meeting information associated with the pre-existing digital calendar event utilizing the machine learning model.

17. A system comprising:
at least one processor; and
a non-transitory computer readable storage medium comprising instructions that, when executed by the at least one processor, cause the system to:
identify a pre-existing digital calendar event comprising a plurality of participants, wherein the pre-existing digital calendar event is accessible to a plurality of computing devices of the plurality of participants;
determine a content connection between a document of a plurality of digital documents stored via a document management system and the pre-existing digital calendar event by processing document content of the document and calendar content of the pre-existing digital calendar event utilizing a machine learning model trained to determine content connections between digital documents and digital calendar events via iterative parameter updates based on historical calendar event characteristics, historical document characteristics, and feedback from comparing predicted documents and corresponding ground truths via a loss function;
based on the determined content connection, recommend the document for the pre-existing digital calendar event by providing, for display within a graphical user interface on a computing device from the plurality of computing devices of the plurality of participants, a recommendation comprising a selectable option to associate the document with the pre-existing digital calendar event; and
in response to receiving a user selection of the selectable option via the computing device, associate the document with the pre-existing digital calendar event such that the document is accessible to other computing devices from the plurality of computing devices of the plurality of participants.

18. The system of claim 17, wherein the instructions, when executed by the at least one processor, cause the system to associate the document with the pre-existing digital calendar event by providing a link corresponding to the document with the pre-existing digital calendar event.

19. The system of claim 17, further comprising instructions that, when executed by the at least one processor, cause the system to:
determine an access characteristic of the document based on one or more of:
  historical sharing information between the plurality of participants;
  participant access credentials of one or more participants of the plurality of participants; or
  historical access information of the document by the one or more participants of the plurality of participants; and
determine the content connection between the document and the pre-existing digital calendar event by processing the access characteristic of the document utilizing the machine learning model.

20. The system of claim 17, further comprising instructions that, when executed by the at least one processor, cause the system to:
determine historical meeting information associated with the pre-existing digital calendar event; and
determine the content connection between the document and the pre-existing digital calendar event by processing the historical meeting information associated with the pre-existing digital calendar event utilizing the machine learning model.

* * * * *